(12) United States Patent
Asad et al.

(10) Patent No.: US 12,524,649 B2
(45) Date of Patent: Jan. 13, 2026

(54) NUMBER FORMAT SELECTION IN RECURRENT NEURAL NETWORKS

(71) Applicant: Imagination Technologies Limited, Kings Langley (GB)

(72) Inventors: Muhammad Asad, Hertfordshire (GB); Elia Condorelli, Hertfordshire (GB); James Imber, Hertfordshire (GB); Cagatay Dikici, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 909 days.

(21) Appl. No.: 17/368,302

(22) Filed: Jul. 6, 2021

(65) Prior Publication Data

US 2022/0044096 A1    Feb. 10, 2022

(30) Foreign Application Priority Data

Jul. 3, 2020 (GB) ..................... 2010279

(51) Int. Cl.
*G06N 3/044* (2023.01)
*G06N 3/045* (2023.01)

(52) U.S. Cl.
CPC ............ *G06N 3/044* (2023.01); *G06N 3/045* (2023.01)

(58) Field of Classification Search
CPC ........ G06N 3/044; G06N 3/045; G06N 3/063; G06N 3/061; G06N 3/04
See application file for complete search history.

(56) References Cited

U.S. PATENT DOCUMENTS

| 10,229,356 | B1 | 3/2019 | Liu et al. |
| 10,621,486 | B2 | 4/2020 | Yao |
| 10,802,992 | B2 | 10/2020 | Yu et al. |

(Continued)

FOREIGN PATENT DOCUMENTS

| CN | 106485321 A | 3/2017 |
| CN | 107403221 A | 11/2017 |

(Continued)

OTHER PUBLICATIONS

Chang et al., "Recurrent Neural Networks Hardware Implementation on FPGA," 2016, arXiv:1511.05552v4 (Year: 2016).*

(Continued)

*Primary Examiner* — Michael J Huntley
*Assistant Examiner* — Vincent Anton Spraul
(74) *Attorney, Agent, or Firm* — Potomac Law Group, PLLC; Vincent M DeLuca

(57) ABSTRACT

A computer-implemented method of selecting a number format for representing two or more values of a recurrent neural network (RNN) for use in configuring a hardware implementation of the RNN, includes receiving a representation of the RNN; implementing the representation of the RNN as a test neural network for operation on a sequence of test inputs, each step of the test neural network comprising an instance of the two or more values of the RNN; operating the test neural network for a plurality of steps on the sequence of test inputs and collecting statistics for provision to a number format selection algorithm; and applying a number format selection algorithm to the statistics so as to derive a common number format for the plurality of instances of the two or more values of the RNN.

19 Claims, 8 Drawing Sheets

(56) References Cited

U.S. PATENT DOCUMENTS

| | | | |
|---|---|---|---|
| 10,885,427 B2 | 1/2021 | Imber | |
| 11,392,823 B2 | 7/2022 | Imber | |
| 11,593,626 B2 | 2/2023 | Imber et al. | |
| 11,769,035 B1 * | 9/2023 | Wei | G06N 3/04 706/15 |
| 2007/0094168 A1 | 4/2007 | Ayala et al. | |
| 2012/0217945 A1 | 8/2012 | Kiadeh et al. | |
| 2014/0046885 A1 | 2/2014 | Majumdar et al. | |
| 2016/0328645 A1 | 11/2016 | Lin et al. | |
| 2016/0328646 A1 | 11/2016 | Lin et al. | |
| 2016/0328647 A1 | 11/2016 | Lin et al. | |
| 2017/0024642 A1 | 1/2017 | Xiong et al. | |
| 2017/0061279 A1 | 3/2017 | Yang et al. | |
| 2017/0140259 A1 | 5/2017 | Bergstra et al. | |
| 2017/0220929 A1 | 8/2017 | Rozen et al. | |
| 2017/0367685 A1 | 12/2017 | Zou et al. | |
| 2018/0017925 A1 | 1/2018 | Yoshimura et al. | |
| 2018/0046896 A1 | 2/2018 | Yu et al. | |
| 2018/0060278 A1 | 3/2018 | Lin et al. | |
| 2018/0107451 A1 | 4/2018 | Harrer et al. | |
| 2018/0181881 A1 | 6/2018 | Du et al. | |
| 2018/0189642 A1 | 7/2018 | Boesch et al. | |
| 2018/0211152 A1 | 7/2018 | Migacz et al. | |
| 2019/0034784 A1 | 1/2019 | Li et al. | |
| 2019/0095777 A1 | 3/2019 | Kim et al. | |
| 2019/0122100 A1 | 4/2019 | Kang et al. | |
| 2019/0180177 A1 | 6/2019 | Yim et al. | |
| 2019/0228293 A1 | 7/2019 | Imber et al. | |
| 2019/0236436 A1 | 8/2019 | Imber et al. | |
| 2019/0236449 A1 | 8/2019 | Imber | |
| 2019/0340499 A1 | 11/2019 | Burger et al. | |
| 2019/0371167 A1 | 12/2019 | Min et al. | |
| 2020/0202218 A1 | 6/2020 | Csefalvay | |
| 2020/0210840 A1 * | 7/2020 | Darvish Rouhani | G06N 3/082 |
| 2020/0349922 A1 | 11/2020 | Peyser et al. | |
| 2021/0183373 A1 | 6/2021 | Moritz et al. | |
| 2021/0319784 A1 | 10/2021 | Le Roux et al. | |
| 2022/0044096 A1 | 2/2022 | Asad et al. | |

FOREIGN PATENT DOCUMENTS

| | | |
|---|---|---|
| CN | 108133285 A | 6/2018 |
| CN | 108205699 A | 6/2018 |
| CN | 108229663 A | 6/2018 |
| CN | 110050256 A | 7/2019 |
| EP | 3242254 A1 | 11/2017 |
| EP | 3671570 A1 | 6/2020 |
| GB | 201715215 | 11/2017 |
| GB | 2566702 A | 3/2019 |
| GB | 2568081 A | 5/2019 |
| GB | 2568082 A | 5/2019 |
| GB | 2568083 A | 5/2019 |
| GB | 2568084 A | 5/2019 |
| GB | 2552243 B | 7/2020 |
| GB | 2580171 A | 7/2020 |
| KR | 101644039 B1 | 7/2016 |
| WO | 9838800 A1 | 9/1998 |
| WO | 2020190526 A1 | 9/2020 |
| WO | 2021022903 A1 | 2/2021 |

OTHER PUBLICATIONS

Bergen et al., "Going in circles is the way forward: the role of recurrence in visual inference," Mar. 2020, arxiv.org/abs/2003.12128v1 (Year: 2020).*

Cambier, et al., "Shifted and Squeezed 8-Bit Floating Point Format for Low-Precision Training of Deep Neural Networks," Jan. 2020, arXiv:2001.05674v1 (Year: 2020).*

TensorFlow Model Optimization Team's article "TensorFlow Model Optimization Toolkit—Post-Training Integer Quantization," Jun. 2019, https://blog.tensorflow.org/2019/06/tensorflow-integer-quantization.html (Year: 2019).*

Jacob et al., "Quantization and Training of Neural Networks for Efficient Integer-Arithmetic-Only Inference," 2017, arXiv: 1712.05877 (Year: 2017).*

Courbariaux , M et al; "Training Deep Neural Networks with Low Precision Multiplications"; (Year:2015); p. 10.

Gupta, S. et al., "Deep Learning with Limited Numerical Precision" (Year:2015); 10 pages.

Lin, D. et al., "Fixed Point Quantization of Deep Convolutional Networks", https://proceedings.mir.press/v48/linb16.html(Year:2016).

Zahangir et al., "Effective Quantization Approaches for Recurrent Neural Networks," International Joint Conference on Neural Networks, 2018, pp. 1-8.

Silfa et al. "Boosting LSTM Performance Through Dynamic Precision Selection," Cornell University Library, 2019, sections 2.1, 2.2, 3.

Anonymous, "Fixed-point Arithmetic," Wikipedia, URL:https:1/en.wikipedia.org/w/index.php?title=Fixed-point_arithmetic&oldid= 782344217; pp. 1-6.

Anwar et al., "Fixed Point Optimization of Deep Convolutional Neural Networks for Object Recognition," IEEE Cassp 2015, 978-1-4673-6997-8, pp. 1131-1135, Aug. 2015.

Balduzzi et al., "Neural Taylor Approximations: Convergence and Exploration in Rectifier Networks," Int'l Conference on Machine Learning, ICLR 2017.

Caffarena et al., "SQNR Estimation of Fixed-Point DSP Algorithms," 2010 EU RAS IP; pp. 1-12.

Graves et al; "Connectionist temporal classification labelling unsegmented sequence data with recurrent neural Networks," ICML '06: Proceedings of the 23rd International Conference on Machine Learning, Jun. 2006 pp. 369-376.

Gysel et al., "Hardware-Oriented Approximation of Convolutional Neural Networks," Cornell University Library, ICLR Apr. 2016, pp. 1-8.

Holt, Jordan L. et al., Finite Precision Error Analysis of Neural Network Hardware Implementations, 1993, IEEE (Year: 1993).

Johnson et al; "Effective Use of Word Order for Text Categorization with Convolutional Neural Networks"; Retrieved from the Internet: URL:https://arxiv.org/pdf/1412.1058; Mar. 26, 2015; 10 pages.

Judd et al; "Proteus: Exploiting precision variability in deep neural networks"; Parallel Computing; vol. 73; May 24, 2017; pp. 40-51.

Ko et al; "Design and Analysis of a Neural Network Inference Engine Based on Adaptive Weight Compression"; IEEE Transactions on Computer-Aided Design of Integrated Circuits and Systems; vol. 38, No. 1; Jan. 2019; pp. 109-121.

Li, G et al., "On comparing three artificial neural networks for wind speed forecasting" (Year: 2010).

Loroch et al; "TensorQuant—A Simulation Toolbox for Deep Neural Network Quantization"; Retrieved from the internet: URL:https:l-larxiv.org/pdf/1710.05758_pdf[retrieved on Feb. 26, 2019] pp. 1-10.

Moons et al., "Energy-Efficient ConvNets Through Approximate Computing," Cornell University Library, arXiv.org > • > arXiv: 1603.06777, Mar. 22, 2016.

Na et al., "Speeding up Convolutional Neural Network Training with Dynamic Precision Scaling and Flexible Multiplier-8 Accumulator," ISLPED '16: Proceedings of the 2016 International Symposium on Low Power Electronics and Design, Aug. 2016, pp. 58-63.

Nan et al; "An Energy Efficient Accelerator for Bidirectional Recurrent Neural Networks (BiRNNs) Using Hybrid-terative Compression with Error Sensitivity," IEEE Transactions on Circuits and Systems, vol. 68, 2021, pp. 3707-3718.

Naren; "AN4 Audio Database—Data Preparation and Running," Data Preparation and Running, 2020, URL: hllps://web.archive.org/web/20200907050552/hllps://github.com/SeanNaren/ deepspeech.torch/wiki/Data-Preparation-I\nd-Running.

Qui et al; "Going Deeper with Embedded FPGA Platform for Convolutional Neural Network"; Proceedings of the 2016 ACM/SIGDA International Symposium on Field-Programmable Gate Arrays; Jan. 1, 2016; pp. 26-35.

Sakr et al., "Analytical Guarantees on Numerical Precision of Deep Neural Networks," Proceedings of the 34th International Confer-

(56) References Cited

OTHER PUBLICATIONS ence on Machine Learning, Sydney, Australia, PMLR 70, 2017, 10 pages.

* cited by examiner

NUMBER FORMAT SELECTION IN RECURRENT NEURAL NETWORKS

BACKGROUND

The present disclosure relates to computer-implemented methods and data processing systems selecting a number format for the values of a Recurrent Neural Network (RNN).

Recurrent Neural Networks (RNNs) are a type of artificial neural network for operation on a sequence of inputs in which state generated during the processing of an input in the sequence is provided for use in the processing of one or more subsequent inputs in the sequence. The outputs of an RNN are thus influenced not just by the network inputs but also by state representing the context of the network at previous points in the sequence. In this manner the operation of an RNN is influenced by the historical processing performed by the network and the same input could produce a different output depending on the previous inputs in the sequence provided to the RNN.

RNNs can be used for machine learning applications. In particular, RNNs can be applied to inputs that represent a time series, potentially a time series of indefinite length. For example, RNNs are used in speech recognition and synthesis, machine translation, handwriting recognition, and time series forecasting.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

There is provided a computer-implemented method of selecting a number format for representing two or more values of a recurrent neural network (RNN) for use in configuring a hardware implementation of the RNN, the method comprising:
 receiving a representation of the RNN:
 implementing the representation of the RNN as a test neural network for operation on a sequence of test inputs, each step of the test neural network comprising an instance of the two or more values of the RNN;
 operating the test neural network for a plurality of steps on the sequence of test inputs and collecting statistics for provision to a number format selection algorithm; and
 applying a number format selection algorithm to the statistics so as to derive a common number format for the plurality of instances of the two or more values of the RNN.

Each step of the test neural network may be for operation on a different test input of the sequence.

The applying the format selection algorithm may comprise applying the number format selection algorithm to the statistics captured over all of the plurality of steps, the common number format being output by the number format selection algorithm.

The common number format may be a block-configurable number format defined by one or more configurable parameters.

The number format selection algorithm may be configured to identify a block-configurable number format of a predefined type of block-configurable number format.

The applying the number format selection algorithm may comprise:
 independently identifying, for each of the plurality of steps, a number format for each instance of the two or more values; and
 combining the number formats for the plurality of instances of the two or more values so as to derive the common number format for the plurality of instances of the two or more values of the RNN.

The number format selection algorithm may be configured to identify a block-configurable number format defined by one or more configurable parameters for each instance of the two or more values.

The combining may comprise independently combining each of the one or more configurable parameters of the block-configurable number formats identified for each instance of the two or more values so as to define the one or more configurable parameters for the common number format.

Independently combining each of the one or more configurable parameters of the block-configurable number formats may comprise determining, for each of the one or more configurable parameters, a median, minimum, maximum, or a mean for use as the respective configurable parameter of the common number format.

The block-configurable number format may comprise a mantissa and an exponent and the one or more configurable parameters include one or more of an exponent value and a bit depth of the mantissa.

The combining the number formats for the plurality of instances of the two or more values may comprise determining median, mean, minimum or maximum exponents of the number formats of the plurality of instances of the two or more values.

The operating the test neural network may be performed with each instance of the two or more values of the RNN in a floating point number format.

The applying the number format selection algorithm to the statistics may be performed concurrently with or subsequently to the collecting of those statistics.

The RNN may comprise a plurality of values including at least the two or more values, and the statistics may comprise one or more of: a mean of at least some of the plurality of values; a variance of at least some of the plurality of values; a minimum or maximum of at least some of the plurality of values; one or more histograms summarising at least some of the plurality of values; and gradients calculated with respect to an RNN output or a measure of error based on an RNN output over at least some of the plurality of values.

The plurality of steps may be a first predetermined plurality of steps.

The implementing the representation of the RNN as a test neural network may comprise transforming the representation of the RNN into a test neural network for operation over the first predetermined plurality of steps, the test neural network being equivalent to the RNN over the first predetermined plurality of steps.

The transforming may comprise unrolling the RNN over the first predetermined plurality of steps so as to form the test neural network.

The test neural network may be configured to operate on a predefined plurality of test inputs, the predefined plurality of test inputs being equal in number to the first predetermined plurality of steps.

The test neural network may be a feed-forward neural network.

The test neural network may have one or more state inputs and the implementing comprises initialising the state inputs to the test neural network according to a predefined set of initial state inputs.

The method may further comprise using the common number formats as the number formats for the respective two or more values in a hardware implementation of the RNN.

The hardware implementation of the RNN may comprise an implementation of the RNN in hardware formed by:
  transforming the representation of the RNN into a derivative neural network for operation over a predetermined plurality of inputs of the sequence of inputs, the derivative neural network having one or more state inputs and one or more state outputs and being equivalent to the RNN over a second predetermined plurality of steps of the RNN; and
  iteratively applying the derivative neural network to the sequence of inputs by:
    implementing a sequence of instances of the derivative neural network in hardware; and
    providing the one or more state outputs from each instance of the derivative neural network at the hardware as the one or more state inputs to a subsequent instance of the derivative neural network at the hardware so as to operate the RNN over a sequence of inputs longer than the predetermined plurality of inputs.

The common number format formed for each of the two or more values of the RNN may be used as the number format for all of the instances of the two or more values in the derivative neural network.

The first predetermined plurality of steps may be different to the second predetermined plurality of steps.

The first predetermined plurality of steps may comprise fewer steps than the second predetermined plurality of steps.

The RNN may comprise one or more cells, each cell arranged to receive a cell state input generated at a preceding step, and the transforming the RNN into the test neural network may further comprise, at each cell:
  identifying non-causal operations which are for performance without dependence on the state input generated at a preceding step; and
  in the derivative neural network, grouping together at least some of the non-causal operations at a plurality of instances of the cell over at least some of the predetermined plurality of steps for processing in parallel at the hardware.

The cell may comprise causal operations which are for performance in dependence on the cell state input and the transforming the RNN further comprises configuring the test neural network such that the result of the non-causal operations performed at the cell in respect of an input from the sequence of test inputs is combined with the causal operations performed at the cell in respect of that same test input.

The two or more values may be used in the non-causal operations and the RNN comprises two or more other values which are used in the causal operations, and the applying the number format selection algorithm to the statistics may be performed so as to independently derive the common number format for the two or more values of the RNN and a second common number format for the two or more other values of the RNN.

The two or more values comprise one or more of: input values; state values; weight values; and output values of the RNN.

The sequence of test inputs may comprise exemplary input values selected to represent a typical or expected range of input values to the RNN.

The number format selection algorithm may be one or more of backpropagation format selection, greedy line search and end-to-end format selection, orthogonal search format selection, maximal range (or "MinMax") format selection, outlier rejection format selection, error-based heuristic format selection (e.g. based on a sum of squared errors with or without outlier weighting), weighted outlier format selection, and a gradient weighting format selection algorithm.

The sequence of inputs may represent a time series.

There is provided a data processing system for selecting one or more number formats for representing two or more values of a recurrent neural network (RNN) for use in configuring a hardware implementation of the RNN, the data processing system comprising:
  a processor;
  control logic configured to implement a representation of the RNN at the processor as a test neural network for operation on a sequence of test inputs, each step of the test neural network comprising an instance of the two or more values of the RNN; and
  a format selection unit configured to cause the processor to operate the test neural network for a plurality of steps on the sequence of test inputs and collect statistics for provision to a number format selection algorithm;
wherein the format selection unit is configured to apply the number format selection algorithm to the statistics so as to derive a common number format for the plurality of instances of the two or more values of the RNN.

The data processing system may further comprise a hardware accelerator for processing neural networks, wherein the control logic is further configured to cause the representation of the RNN to be implemented at the hardware accelerator using the common number format for the two or more values of the RNN.

The data processing system may further comprise:
  a transformation unit configured to transform the representation of the RNN derivative neural network for operation over a predetermined plurality of inputs of a sequence of inputs, the derivative neural network having one or more state inputs and one or more state outputs and being equivalent to the RNN over a predetermined plurality of steps of the RNN;
  iteration logic configured to, subsequent to the operation of the test neural network at the processor, iteratively apply the derivative neural network to the sequence of inputs by:
    causing a sequence of instances of the derivative neural network to be implemented at the hardware accelerator; and
    providing the one or more state outputs from each representation of the derivative neural network at the hardware accelerator as the one or more state inputs to a subsequent representation of the derivative neural network at the hardware accelerator so as to cause the hardware accelerator to operate the RNN over a sequence of inputs longer than the predetermined plurality of inputs.

The hardware accelerator may be one and the same as the processor.

There may be provided a data processing system configured to perform any of the methods described herein. There may be provided computer program code for performing a method as described herein. There may be provided non-transitory computer readable storage medium having stored thereon computer readable instructions that, when executed at a computer system, cause the computer system to perform the methods as described herein.

BRIEF DESCRIPTION OF THE DRAWINGS

The present invention is described by way of example with reference to the accompanying drawings. In the drawings.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

Figure 1:
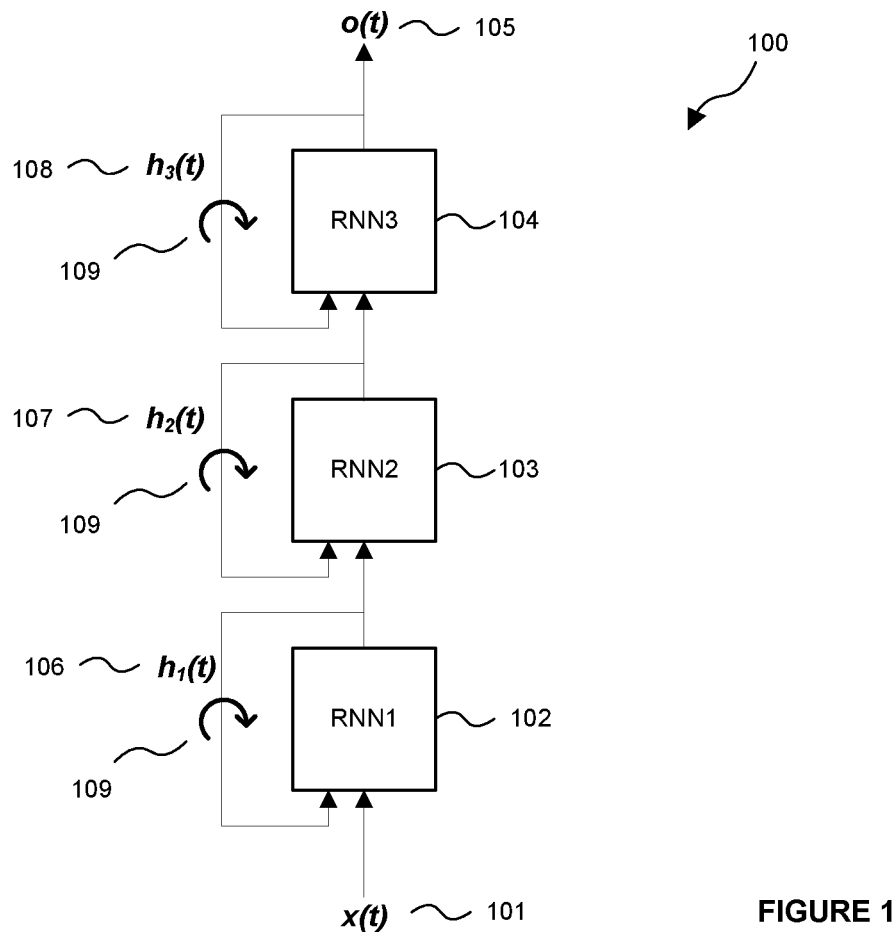
FIG. 1 is an example of a Recurrent Neural Network (RNN) comprising three stacked RNN cells.

FIG. 1 shows an example of a Recurrent Neural Network (RNN) 100 which will be used to illustrate the implementation of an RNN in hardware according to the principles described herein. The network comprises three stacked RNN cells RNN1, RNN2 and RNN3 (102-104 in the figure). Each cell may comprise one or more network operations. Each RNN cell processes the state generated by that RNN cell in respect of a previous timestep of the input sequence in a manner defined by the operations comprising the cell and one or more network parameters (which may be referred to herein as "weights"). An RNN cell is a subgraph (subnetwork) that may be used as a component in an RNN. It takes one or more input data tensors, one or more state input tensors (a cell state input), and may generate one or more state output tensors and/or one or more output data tensors for that time step. Some of the output data tensors emitted by the cell may be identical to the output state tensors emitted by the cell.

The RNN is configured to operate on a time series $x(t)$ 101 which could be, for example, a series of audio samples on which the RNN is to perform speech recognition. The representation of the RNN in FIG. 1 represents the RNN at a general time step t. At each time step t the RNN provides an output $o(t)$ 105. By operating the RNN on the input at each timestep of an input sequence $x(t)$, the RNN generates a respective sequence of outputs $o(t)$.

The input and output sequences may be indefinite in length. An RNN may therefore be used to process time series where the length or contents of the time series are not known when processing begins—for example, audio samples of live speech which might be captured for the purpose of enabling voice control of a device. More generally, an RNN may operate on any sequence of inputs, which may not be a time series. Reference in this disclosure to time series, for example "timesteps", will be understood to apply equally to any sequence of inputs, including but not limited to time series. The operation of the RNN in respect of each input of the sequence represents a step of the RNN, each operation being a single iteration of the RNN—i.e. a single application of the RNN represented in its original form.

It will be appreciated that although in the examples described herein the RNN generates a single output in correspondence with each of a sequence of inputs, the methods described equally apply to RNNs having other configurations, including for example: RNNs which generate a single output at the end of an input sequence (e.g. an RNN adapted to perform classification); RNNs which generate fewer outputs than the network receives inputs; RNNs comprising branches that give different outputs for the same inputs, e.g. 2 output sequences in 1:1 correspondence to the input sequence.

Each RNN cell may in fact comprise a plurality of operations each arranged to perform a different set of calculations—for example, an RNN cell could include one or more matrix multiplication operations, convolution operations, activation operations and concatenation operations arranged into an RNN cell which operates on both an input (which could be from a preceding RNN cell in the network) and state generated on processing an RNN cell at a preceding time step.

The first RNN cell 102 receives input data at time step t from a time series $x(t)$ 101 and processes the input in accordance with the set of calculations predefined for the cell. The processing at the first cell is further performed in dependence on state $h_1(t-1)$ generated during processing of the preceding input $x(t-1)$ at the first cell. In the figure, the state passed forward for use during processing of the next time step is shown as state $h_1(t)$ 106 which is subject to a delay 109 such that state $h_1(t)$ is provided to the first cell with input $x(t+1)$.

The second and third RNN cells in FIG. 1 operate in a similar manner to the first RNN cell, but the second RNN cell receives the output of the first RNN cell as its input, and the third RNN cell receives the output of the second RNN cell as its input. The output of the third RNN cell $o(t)$ 105 is the output of the RNN. Each of the second and third RNN cells performs its own predefined set of calculations on their respective inputs. As for the first RNN cell, the second and third RNN cells receive state inputs from the processing performed at one or more preceding timesteps. In the figure, the second RNN cell 103 outputs state $h_2(t)$ 107 which is provided as the state input to the second RNN cell at timestep t+1, and the third RNN cell 104 outputs state $h_3(t)$ 108 which is provided as the state input to the third RNN cell at timestep t+1. For the first time step at t=0, predefined initial state values are typically used to initialise the RNN. The initial state values could, for example, be a constant, a learned initial state, or all zeros.

In the figure, the output of an RNN cell at timestep t is provided as the state input to that RNN cell at timestep t+1, but in general, the state may comprise one or more tensors generated at the first RNN cell and/or the output of the first RNN cell. In general, the state input to a cell could include state from one or more preceding timesteps, e.g. the state could additionally or alternatively include state from processing timestep t−2. In some networks, the state input to a cell could additionally or alternatively include state data generated at other RNN cells of the network, e.g. the state data provided to the first RNN cell could include state data from the second RNN cell.

The RNN shown in FIG. 1 is a simple example. In general, an RNN may comprise one or more RNN cells and one or more other processing steps may be performed on the inputs to an RNN, the outputs from an RNN, and/or between the cells of an RNN. For example, an RNN may further comprise one or more convolution operations, activation operations, fully connected operations which process the inputs, outputs or intermediate outputs between cells. Input x(t) and the state $h_t(t)$ are tensors having any dimensions as appropriate to the application.

Figure 2:
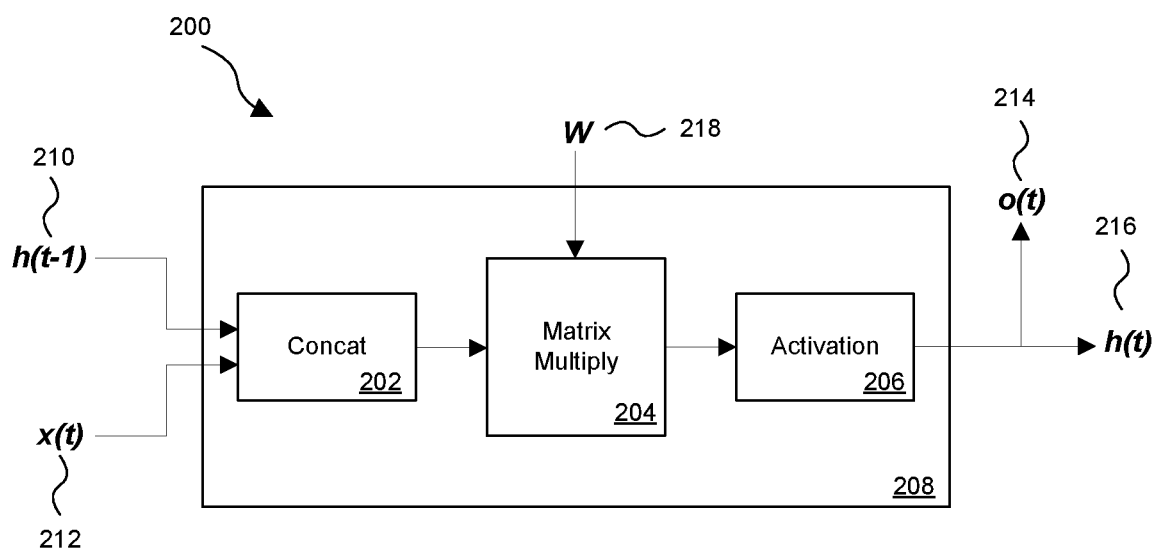
FIG. 2 is a schematic diagram of an RNN cell.

FIG. 2 is a schematic diagram of a simple RNN cell 200. One or more of the RNN cells 102-104 in FIG. 1 may have the structure of the RNN cell 200. In the manner described in relation to FIG. 1, RNN cell 200 receives an input x(t) 212 (which for higher cells may be the output of a lower cell) and state h(t−1) 210 from the operation of the RNN cell 200 on the input of the previous timestep x(t−1). The RNN cell itself comprises multiple operations. The input and state are combined at concatenation operation 202 (e.g. concatenated along a channel dimension) which provides a tensor input to a matrix multiplication operation 204. The matrix multiplication operation receives a weight tensor as a matrix W 218 for multiplication with the concatenated tensor generated by concatenation operation 202. The output of the matrix multiplication operation 204 is then operated on by an activation operation 206, which applies an activation function to the output of the matrix multiplication operation. The activation function may be any function as appropriate to the application of the RNN—for example, the activation function may be tanh, a ReLU function, or a sigmoid function.

The output of the RNN cell 200 is provided as output o(t) 214 and is also provided as state h(t) 216 for use by the RNN cell at the next timestep. In other examples the state may be different to the output of the RNN cell (e.g. it may include intermediate tensors generated during operations performed at the RNN cell) and/or the state may comprise a plurality of tensors.

The operation of the RNN cell 200 on an input tensor x(t) in the case that the activation function is tanh can be represented as:

$$o(t) = h(t) = \tanh\left(W \begin{bmatrix} x(t) \\ h(t-1) \end{bmatrix}\right) \quad (1)$$

The RNN cell 200 is a simple example of an RNN cell. It will be understood that there are many different kinds of RNN cell which may be implemented according to the principles described herein. For example, an RNN cell of an RNN implemented as described herein may be an LSTM (Long Short Term Memory) cell or a GRU (Gated Recurrent Unit) cell, as are known in the art. Different types of RNN cell have different characteristics and it will be appreciated that the choice of any particular type of RNN cell may be determined by the particular application to which an RNN is dedicated.

Figure 3:
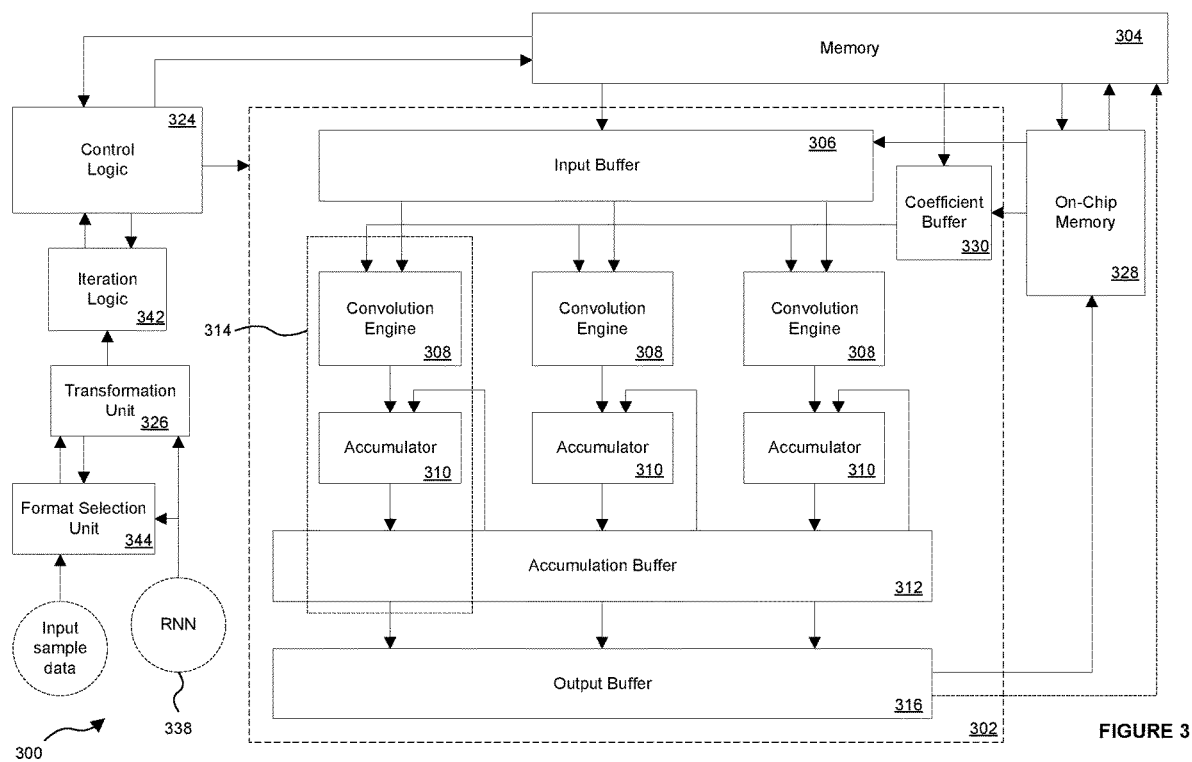
FIG. 3 is a schematic diagram of a data processing system for implementing an RNN.

A data processing system 300 for implementing an RNN is illustrated in FIG. 3. The data processing system comprises an accelerator 302 for performing the tensor operations of a neural network. The accelerator may be referred to as a Neural Network Accelerator (NNA). The accelerator comprises a plurality of configurable resources which enable different kinds of feed-forward neural network, such as various convolutional neural networks and multi-layer perceptrons, to be implemented at the accelerator.

The implementation of an RNN in hardware will be described with respect to the data processing system shown in the particular example of FIG. 3 in which the accelerator 302 includes a plurality of processing elements 314 each comprising a convolution engine, but it will be understood that—unless stated otherwise—the principles described herein for implementing an RNN in hardware are generally applicable to any data processing system comprising an accelerator capable of performing the tensor operations of a neural network.

In FIG. 3, the accelerator includes an input buffer 306, a plurality of convolution engines 308, a plurality of accumulators 310, an accumulation buffer 312, and an output buffer 316. Each convolution engine 308, together with its respective accumulator 310 and its share of the resources of the accumulation buffer 312, represents a hardware processing element 314. Three processing elements are shown in FIG. 3 but in general there may be any number. Each processing element receives a set of weights from a coefficient buffer 330 and input values (e.g. of an input tensor) from input buffer 306. The coefficient buffer may be provided at the accelerator—e.g. on the same semiconductor die and/or in the same integrated circuit package. By combining the weights and the input tensors the processing elements are operable to perform the tensor operations of a neural network.

In general, accelerator 302 may comprise any suitable tensor-processing hardware. For instance in some examples the accelerator may comprise pooling units (e.g. for implementing max-pooling and average-pooling operations), or element processing units for performing per-element mathematical operations (e.g. adding two tensors together). Such units are not shown in FIG. 3 for simplicity.

The processing elements of the accelerator are independent processing subsystems of the accelerator which can operate in parallel. Each processing element 314 includes a convolution engine 308 configured to perform convolution operations between weights and input values. Each convolution engine 308 may comprise a plurality of multipliers, each of which is configured to multiply a weight and a corresponding input data value to produce a multiplication output value. The multipliers may be, for example, followed by an adder tree arranged to calculate the sum of the multiplication outputs. In some examples, these multiply-accumulate calculations may be pipelined.

A large number of hardware operations must typically be performed at an accelerator in order to execute each tensor operation of a neural network. This is because the input and weight tensors are often very large. Since it may take more than one hardware pass of a convolution engine to generate a complete output for a convolution operation (e.g. because a convolution engine may only receive and process a portion of the weights and input data values) the accelerator may comprise a plurality of accumulators 310. Each accumulator 310 receives the output of a convolution engine 308 and adds the output to the previous convolution engine output that relates to the same operation. Depending on the implementation of the accelerator, a convolution engine may not process the same operation in consecutive cycles and an accumulation buffer 312 may therefore be provided to store partially accumulated outputs for a given operation. The appropriate partial result may be provided by the accumulation buffer 312 to the accumulator at each cycle.

The accelerator may include an input buffer 306 arranged to store input data required by the accelerator (e.g. the convolution engines) and a coefficient buffer 330 arranged to store weights required by the accelerator (e.g. the convolution engines) for combination with the input data according to the operations of the neural network. The input buffer may include some or all of the input data relating to the one or more operations being performed at the accelerator on a given cycle. The coefficient buffer may include some or all of the weights relating to the one or more operations being processed at the accelerator on a given cycle.

The various buffers of the accelerator shown in FIG. 3 may be implemented in any suitable manner—e.g. as any number of data stores which are local to the accelerator (e.g. on the same semiconductor die and/or provided within the same integrated circuit package) or accessible to the accelerator over a data bus or other interconnect.

A memory 304 may be accessible to the accelerator—e.g. the memory may be a system memory accessible to the accelerator over a data bus. An on-chip memory 328 may be provided for storing weights and/or other data (such as input data, output data, etc.). The on-chip memory may be local to the accelerator such that the data stored in the on-chip memory may be accessed by the accelerator without consuming memory bandwidth to the memory 304 (e.g. a system memory accessible over a system bus). Data (e.g. weights, input data) may be periodically written into the on-chip memory from memory 304. The coefficient buffer 330 at the accelerator may be configured to receive weight data from the on-chip memory 328 so as to reduce the bandwidth between the memory and the coefficient buffer. The input buffer 306 may be configured to receive input data from the on-chip memory 328 so as to reduce the bandwidth between the memory and the input buffer. The memory may be coupled to the input buffer and/or the on-chip memory so as to provide input data to the accelerator.

The accumulation buffer 306 may be coupled to an output buffer 316, to allow the output buffer to receive intermediate output data of the operations of a neural network operating at the accelerator, as well as the output data of the end operation (i.e. the last operation of a network implemented at the accelerator). The output buffer 316 may be coupled to the on-chip memory 328 for providing the intermediate output data and output data of the end operation to the on-chip memory 328, e.g. for use as state when implementing an RNN at the accelerator in the manner described below.

Typically, it is necessary to transfer a large amount of data from the memory to the processing elements. If this is not done efficiently, it can result in a high memory bandwidth requirement, and high power consumption, for providing the input data and weights to the processing elements. This is particularly the case when the memory is "off-chip"—that is, implemented in a different integrated circuit or semiconductor die from the processing elements. One such example is system memory accessible to the accelerator over a data bus. In order to reduce the memory bandwidth requirements of the accelerator when executing a neural network, it is advantageous to provide a memory which is on-chip with the accelerator at which at least some of the weights and/or input data required by an implementation of a neural network at the accelerator may be stored. Such a memory may be "on-chip" (e.g. on-chip memory 328) when the memory is provided on the same semiconductor die and/or in the same integrated circuit package.

The various exemplary connections are shown separately in the example of FIG. 3, but, in some embodiments, some or all of them may be provided by one or more shared data bus connections. It should also be understood that other connections may be provided, as an alternative to or in addition to those illustrated in FIG. 3. For example, the output buffer 314 may be coupled to the memory 304, for providing output data directly to the memory 304. Likewise, in some examples, not all of the connections illustrated in FIG. 3 may be necessary. For example, the memory 304 need not be coupled to the input buffer 306 which may obtain input data directly from an input data source—e.g. an audio subsystem configured to sample the signal from a microphone dedicated to capturing speech from a user of a device comprising the data processing system.

Implementing an RNN in Hardware

Implementing an RNN in hardware on data processing systems adapted to perform neural networks with no recurrency is generally not possible on hardware such as the accelerator described above since such systems require a neural network representable by a complete static graph. In order to permit the execution of RNNs on hardware adapted to perform non-recurrent neural networks, the inventors propose unrolling the RNN over a predetermined number of timesteps so as to create a static neural network having a fixed set of state inputs and a fixed set of state outputs. This approach transforms the dynamic graph of an RNN into a static graph of a non-recurrent neural network which is suitable for implementation at an accelerator according to conventional implementation and optimisation algorithms. By iterating the static unrolled RNN and providing the state outputs of a first iteration of the unrolled RNN as the state inputs to the next iteration of the unrolled RNN, the RNN may be performed over an input sequence of indefinite length.

Static neural networks are feed-forward neural networks which can be represented by a static graph. Dynamic neural networks include one or more feedback loops and cannot be represented by a static graph. The output of a dynamic neural network at a given step depends on the processing performed at one or more preceding steps of the neural network. A computational graph or neural network that contains one or more feedback loops may therefore be referred to as a dynamic graph or neural network. Conversely, a computational graph or neural network without feedback loops may be referred to as a static or feed-forward graph or neural network. The derivative neural networks described herein are feed-forward neural networks.

Figure 4:
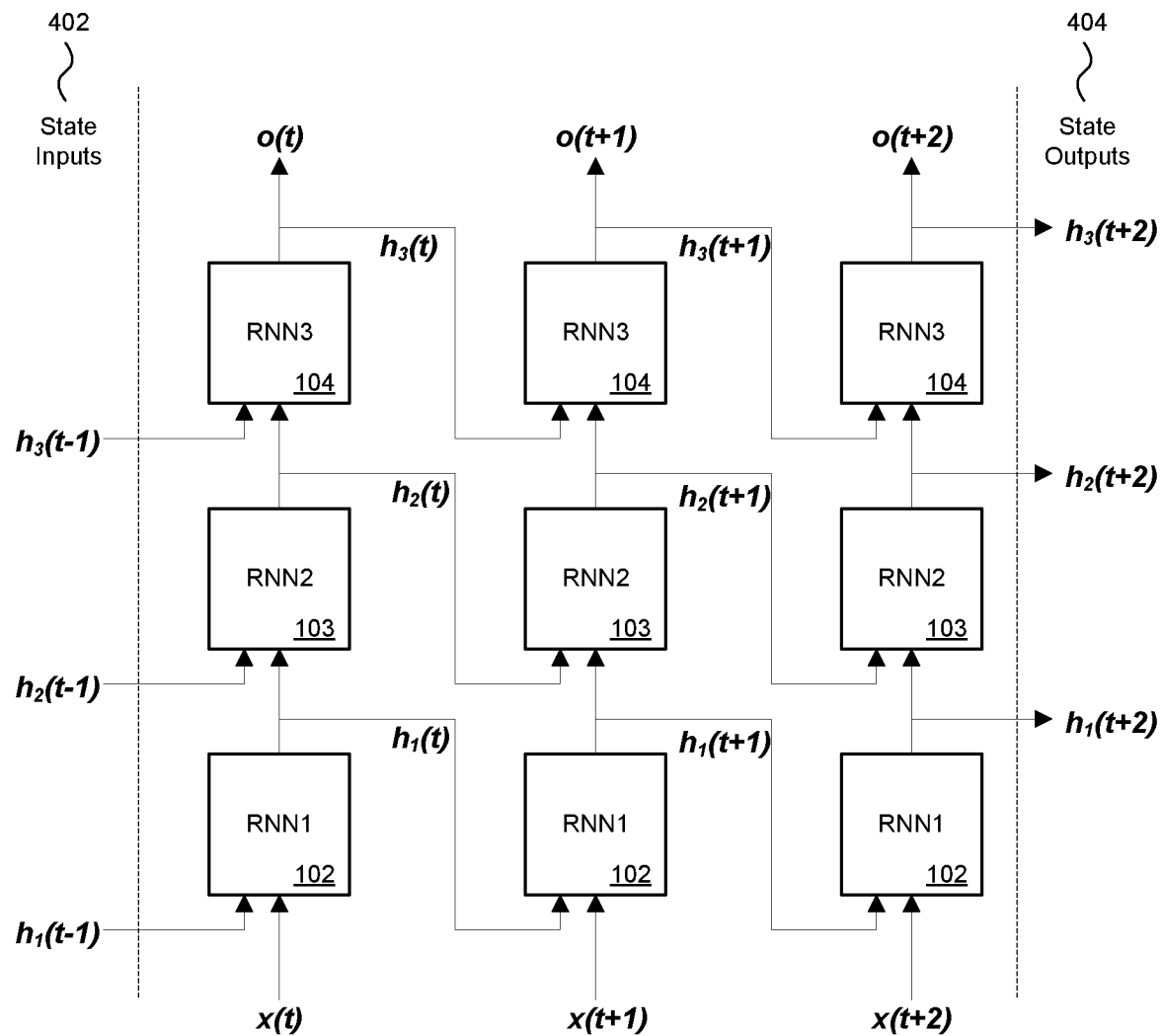
FIG. 4 illustrates the dynamic RNN of FIG. 1 unrolled over three timesteps to form a static (i.e. a feed-forward) derivative neural network.
Figure 4:
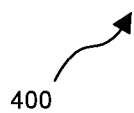

By way of example, FIG. 4 illustrates the three-cell RNN of FIG. 1 unrolled over three timesteps t, t+1, and t+2 so as to form an unrolled RNN 400. It can be seen from FIG. 4 that the state output $h_1(t)$ of the first RNN cell 102 at timestep t is provided as the state input to an identical instance of that first RNN cell 102 at the next time step t+1. And the state output $h_1(t+1)$ of the first RNN cell at timestep t+1 is provided as the state input to an identical instance of that first RNN cell 102 at the next time step t+2. Similarly, the state outputs of each of the second RNN cells 103 and third RNN cells 104 are provided as the state inputs to identical instances of those second and third RNN cells at the next time step. The unrolled RNN generates an output o(t) in respect of each of the sequence of inputs x(t).

The three state outputs $h_i(t+2)$ of the three RNN cells 102-104 at the last time step t+2 of the unrolled RNN 400 are provided as the state outputs 404 of the unrolled RNN. The unrolled RNN 400 has three state inputs 402 which are the state inputs $h_i(t-1)$ to the three RNN cells 102-104 at the first time step t. By providing the state outputs 404 of a first instance of the unrolled RNN 400 as the state inputs 402 of the next instance of the unrolled RNN 400, the processing performed by the unrolled RNN may be iterated over an input sequence x(t) of indefinite length.

Since all of the first RNN cells are identical, all of the second RNN cells are identical, and all of the third RNN cells are identical it will be appreciated that, mathematically, the unrolled RNN 400 shown in FIG. 4 is equivalent to operating the RNN shown in FIG. 1 over a sequence of three inputs. In general, an RNN may be unrolled over any plurality of time steps. The example shown in FIG. 4 shows the RNN unrolled over only three steps but in a practical system the number of time steps would typically be larger— for example, the RNN may be unrolled over 16 time steps.

Figure 5:
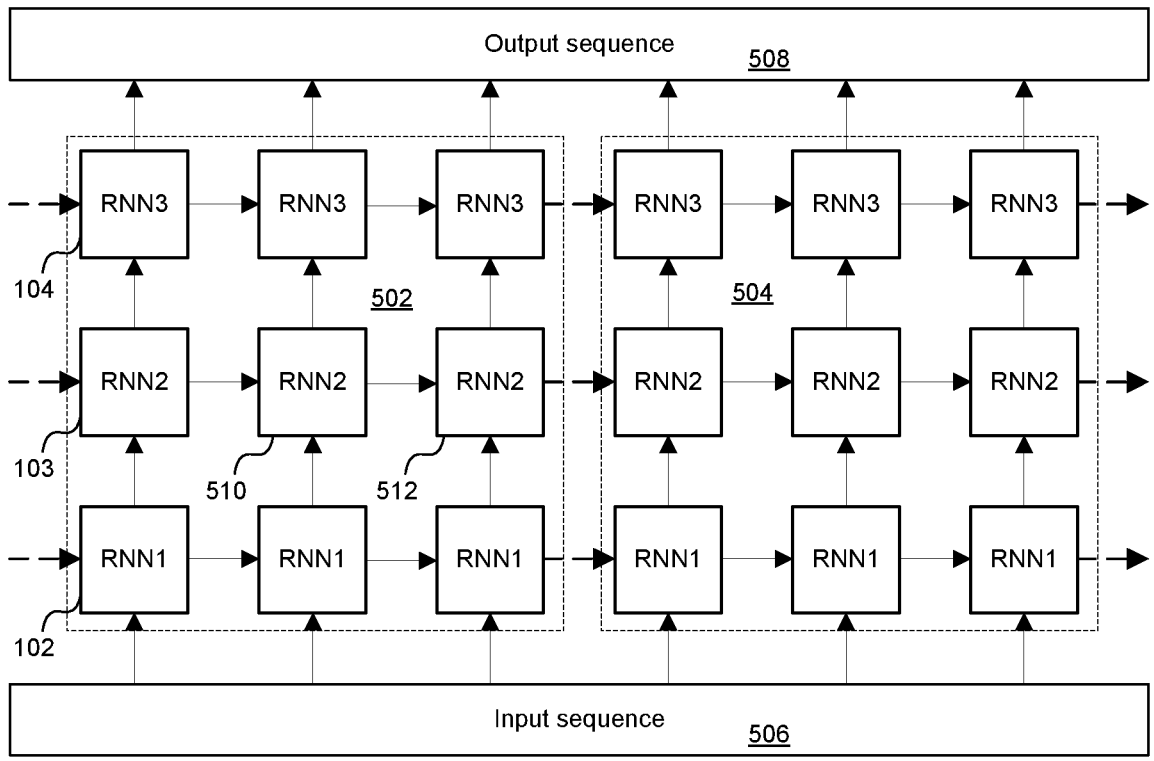
FIG. 5 illustrates the unrolled RNN of FIG. 4 operating iteratively on an input sequence.

The iteration of the unrolled RNN 400 is illustrated in FIG. 5 in which the state outputs (network state outputs) of a first instance 502 of the unrolled RNN are provided as the state inputs (network state inputs) to a second instance 504 of the unrolled RNN. The iterated unrolled RNNs operate on an input sequence 506, with each instance of the unrolled RNN operating on three inputs from the input sequence— e.g. the first instance may operate on inputs x(t) to x(t+2), and the second instance may operate on inputs x(t+3) to x(t+5). The set of inputs operated on by each instance of the unrolled RNN may be termed a 'partition' of the input sequence—thus, each iteration of the unrolled RNN operates on a corresponding partition of the input sequence, each partition comprising a predetermined number of timesteps.

The iterated unrolled RNNs generate an output sequence 508. For simplicity, the passing of state values between instances of an RNN cell at successive timesteps is illustrated schematically in FIG. 5 by a simple arrow but it will be appreciated that, for example, the state generated at second cell instance 510 processing an input at time step t+1 will not be available to second cell instance 512 processing an input at time step t+2 until the relevant processing at second cell instance 510 has completed.

The implementation of an RNN in hardware will now be described with reference to the data processing system of FIG. 3. In general, the principles described herein may be applied to the implementation of an RNN at any accelerator capable of performing the tensor operations of a neural network. For example, the accelerator could be a graphics processing unit (GPU), a tensor accelerator, a digital signal processor (DSP), or a neural network accelerator (NNA). The accelerator 302 may not be capable of independent execution and may require management and configuration (e.g. by control logic 324) in order to execute code.

In order to implement an RNN 338 on accelerator 302, a transformation unit 326 is configured to perform the unrolling of the RNN over a predetermined number of time steps (a partition of an input sequence) so as to generate an unrolled RNN in the manner described with respect to FIGS. 4 and 5. Rather than attempt to configure the accelerator 302 to perform the RNN in its recurrent form which would require the accelerator to implement the dynamic graph of an RNN, the transformation unit provides an unrolled RNN for implementation at the accelerator 302. As an unrolled RNN can be represented by a static graph, it may be implemented at an accelerator which would otherwise not be capable of performing the RNN in hardware. As a result, the same accelerator can be used to implement either recursive or non-recursive neural networks, extending its utility. The approach described herein comprises executing the unrolled RNN at an accelerator so as to perform the originally defined RNN.

Control logic 324 is configured to implement neural networks at the accelerator. The control logic configures the processing elements 314 of the accelerator to perform the tensor operations of a neural network, e.g. by setting the appropriate accelerator parameters, defining appropriate data structures at the memory 304 and on-chip memory 328, and passing references to those data structures to the accelerator along with the instructions defining the tensor operations to be executed. The control logic may cause the weights required by the tensor operations to be read into the coefficient buffer 330 (e.g. via on-chip memory 328), and an input to be provided to input buffer 306. A large number of hardware operations must typically be performed at an accelerator in order to execute each tensor operation of a neural network. This is because the input and weight tensors are often very large. It will generally take more than one hardware pass of the processing elements 314 to generate a complete output for an operation. The control logic may be configured to synchronise the provision of weights and input data to the processing elements of the accelerator such that the output of each operation is accumulated at the accumulation buffer 312 over a number of passes.

The use of control logic to configure and manage the processing of a neural network at an accelerator is known in the art and suitable control logic is typically provided with an accelerator for implementing neural networks. Control logic 324 may comprise one or more of: software (e.g. a driver) executing at a processor of the data processing system 300 (e.g. a CPU); firmware (e.g. at the accelerator 301 itself); a dedicated processor such as may be implemented in a system on chip (SoC) at or coupled to accelerator 302. In some examples, the control logic may comprise a driver running at a general purpose processor of the data processing system and firmware running at an SoC of the accelerator 302. Typically the accelerator will comprise on-device registers that configure aspects of the operations performed by the accelerator and the control logic will set these registers in order to appropriately configure the accelerator to implement a given neural network.

The data processing system further comprises the transformation unit 326 to convert an RNN into a static neural network for implementation at the accelerator. In some examples, the transformation unit 326 may be provided at the control logic, but other arrangements are possible—e.g. the transformation unit may be separate logic embodied in software, hardware or firmware at the data processing system. In some examples, the transformation unit is software configured to process an RNN prior to its submission to the control logic for implementation in hardware at the accelerator.

Figure 8:
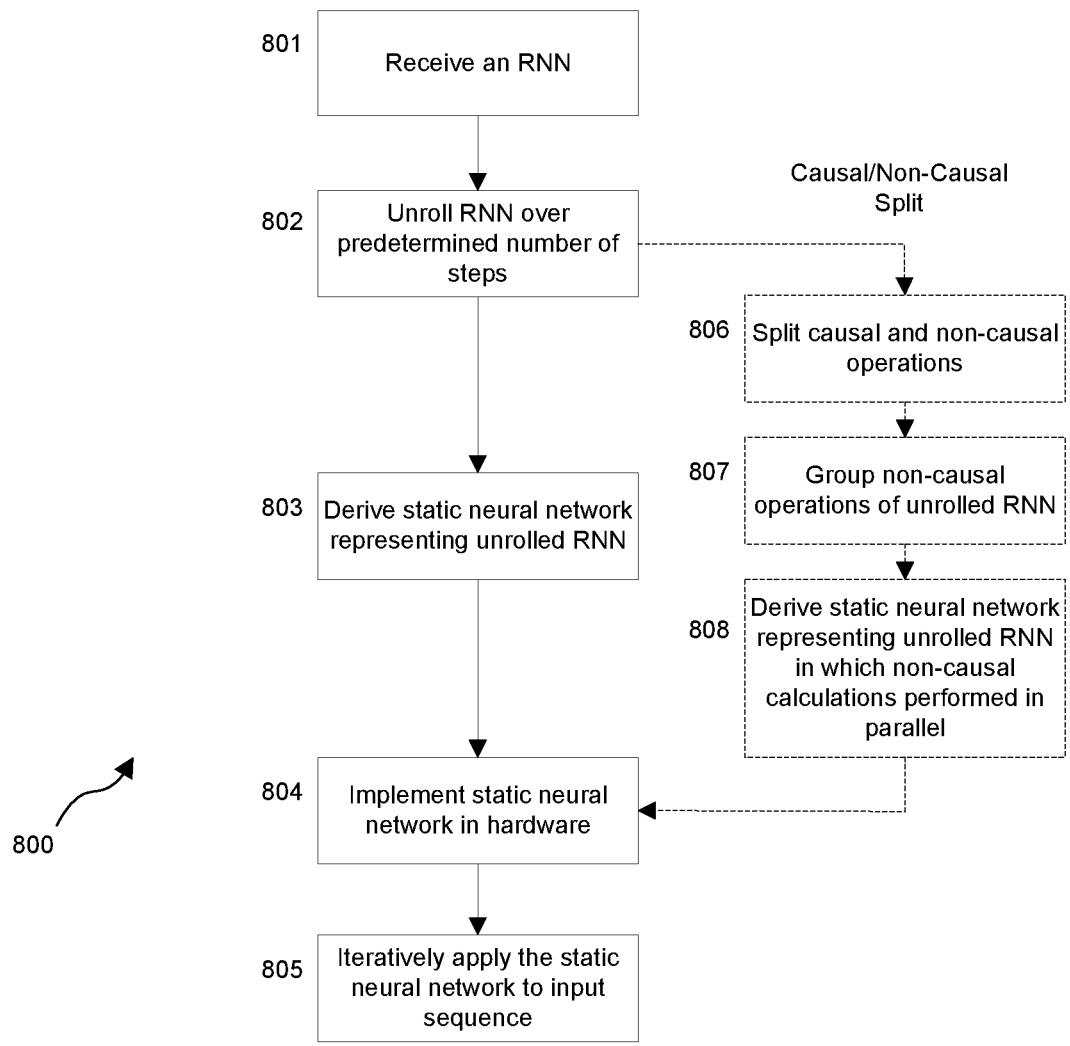
FIG. 8 is a flowchart illustrating methods of transforming an RNN to make it suitable for implementation on an accelerator capable of executing static graphs.

The operation of the transformation unit 326 will now be described with reference to the flowchart 800 shown in FIG. 8 which illustrates a method of implementing an RNN in hardware. At 801, a representation of the RNN 338 to be implemented in hardware is received at the transformation unit. The RNN representation may be represented in any suitable manner—such as a mathematical representation, or any other representation of the RNN on which the transformation unit is configured to operate. There are several standards for high-level definitions of a neural network, any of which could be suitable input to the algorithm.

Deep learning framework APIs tend to be close to pure mathematical definitions, and there are some cross-framework "standards" that work at a similar level (e.g. ONNX). Code which is ready for execution at a particular accelerator will typically be closer to the hardware and include features specific to that hardware. There are also widely-used intermediate representations, such as Relay, which are typically used in Deep Neural Network (DNN) compilers.

The transformation unit is configured to unroll 802 the RNN over a predetermined number of steps. Any of the various approaches known in the art for unrolling (sometimes termed unfolding) an RNN may be used. For example, mathematical approaches to unrolling an RNN are described in Chapter 10 (see in particular 10.1) of Deep Learning by Ian Goodfellow, Yoshua Bengio, & Aaron Courville, MIT Press, 2016, which is incorporated by reference in its entirety.

It is advantageous to select the predetermined number of steps in dependence on the particular characteristics of the accelerator so as to optimise the performance of the unrolled RNN on the accelerator whilst maintaining acceptable latency. For example, an instance of a static unrolled RNN implemented in hardware at the accelerator will typically require all of the inputs of a partition (i.e. a number of inputs equal to the number of time steps processed by the unrolled RNN) to be available prior to execution of that instance commencing. As a result, whilst increasing the predetermined number of steps will typically improve the efficiency of execution, this will also have the effect of increasing the latency of the RNN. This can be significant in many applications, particularly those where real-time processing is performed, such as in voice recognition applications.

Transformation unit 326 unrolls the RNN over a predetermined number of steps so as to derive 803 a static neural network which represents a portion of the complete unrolled RNN which is mathematically equivalent to the received representation of the RNN. The state inputs to the first time step of the derivative neural network are provided as state inputs to the derivative neural network itself and the state outputs from the last time step of the derivative neural network are provided as state outputs from the derivative neural network itself. This enables the derivative neural network to be iterated in the manner shown in FIG. 5, with the state outputs from a first instance of the derivative neural network being provided as the state inputs to the next instance of the derivative neural network.

The control logic 326 is configured to implement 804 the derivative neural network in hardware at the accelerator 302. As described above, this can be performed in accordance with the conventional approach to implementing neural networks on the accelerator, e.g. through the use of a driver for the accelerator and firmware executing at the accelerator.

The data processing system further comprises iteration logic 342 which is configured to iteratively apply 805 the derivative neural network to the input sequence and to cause the state outputs from each instance of the derivative neural network (e.g. 404 in FIG. 4) as the state inputs to the next instance of the derivative neural network (e.g. 402 in FIG. 4). The iteration logic may cause each instance of the derivative neural network to be implemented at the accelerator 302 by providing the same derivative neural network to the control logic for implementation at the accelerator each time the current instance of the derivative neural network implemented at the accelerator has completed its processing. Successive instances of the derivative neural network would of course operate on successive inputs from a sequence of inputs on which the RNN is to operate.

The passing of state tensors between instances of the derivative neural network may be achieved in any suitable manner. For example, the iteration logic 342 may cause state to be written to on-chip memory 328 so as to retain the state tensors between iterated instances of the derivative neural network. Typically, the content of the buffers of the accelerator will be overwritten on each new instance of the derivative neural network being executed at the accelerator. The state is configured to persist between instances of the derivative neural network—e.g. by writing the state to a protected data store accessible to the accelerator, such as on-chip memory 328. In other examples, the state may be written out to memory 304 and read back in when the new instance of the derivative neural network is initialised at the accelerator.

By iterating the derivative neural network over the sequence of inputs received for processing at the accelerator, the data processing system 300 can be configured to effect operation of the complete RNN 338 in hardware through the repeated application of the static derivative neural network at the accelerator on input sequences of indefinite length, in the manner illustrated in FIG. 5. In particular, by recasting RNNs as a static derivative neural network for operation on a fixed length partition of an input sequence, the approach described herein enables RNNs to be implemented at hardware which cannot execute an RNN expressed as a dynamic graph.

Causal/Non-Causal Split

Hardware for performing neural network operations, such as neural network accelerators (NNAs), are typically optimised to perform large numbers of tensor calculations in parallel. The parallel nature of hardware accelerators is especially useful when running convolutional neural networks, for which each convolution layer can be processed in parallel—for example across a plurality of processing elements 314. However, when recurrency is introduced and the calculations performed at cells of a neural network at a given time step depend on calculations performed at cells of the neural network in respect of previous time steps, existing approaches can result in poor performance. This is a result of several factors, including low utilisation of the parallel architectures typical of accelerators for executing neural networks, poor suitability of existing optimisation algorithms to adapting an RNN for execution in hardware, and high memory bandwidth consumed as a result of inefficiently reading weights and input data into the accelerator at every time step.

The inventors have recognised that substantial improvements to the performance of RNNs implemented in hardware can be achieved by splitting the operations performed in an RNN cell (e.g. at one or more of the RNN cells shown in FIG. 4 or 5) into a set of non-causal operations and a set of causal operations. Causal operations of an RNN cell are those which are performed in dependence on state received as a state input of that cell. Non-causal operations of an RNN cell are those which can be executed without any dependence on state received as a state input of that cell—i.e. those operations of a cell which can be performed once the input data to that cell are known. Non-causal operations may therefore be executed simultaneously once the respective input data are available for those operations. Since there is no strict order of execution that needs to be observed for the non-causal parts, it is possible to execute multiple timesteps in parallel for more efficient use of the hardware, leading to benefits such as higher utilisation and faster inference times.

In particular, in hardware such as accelerator 302 which comprises a plurality of processing instances 314, the splitting out of the non-causal calculations enables them to be performed in parallel across the processing instances.

It will be appreciated that, when splitting the operations as discussed above, the causal operations may include one or more non-causal calculations—e.g. because it is advantageous to perform those non-causal calculations with the causal operations. However, the set of non-causal operations cannot include any causal calculations since the non-causal operations are to be performed in parallel in hardware. Thus, it shall be understood that references to causal operations herein refer to a set of operations which includes all of the causal operations of an RNN cell but which may also include some of the non-causal operations of the RNN cell; and references to non-causal operations herein refer to a set of operations which includes at least some of the non-causal operations of an RNN cell for performance in parallel and no causal operations of the RNN cell.

The transformation unit 326 is configured to split out the non-causal operations from the causal operations and form a static neural network for implementation at the accelerator 302 which represents the unrolled RNN but with the non-causal operations of a partition being grouped together for performance in parallel. An example as to how causal and non-causal operations may be split for an RNN cell will now be described. The same approach can be adopted for each cell of the RNN. It will be appreciated that, depending on the particular operations of the RNN and the available parallel processing elements in hardware, non-causal operations may be performed in parallel other than by convolutions.

Returning to FIG. 2, it will be observed that the combination of the weights 218 with the concatenated input 212 and state 210 is performed as a matrix multiplication 204. FIG. 2 shows a simple example of an RNN cell but more complex RNN cells such as LSTM or GRU cells can also be represented as a set of one or more matrix operations on a set of input and state tensors, along with various activation and other functions. Other types of cell may comprise other types of mathematical operations which may also be separated into causal and non-causal parts in accordance with the principles set out herein. Other types of operation may be split using different techniques. For example, a concatenation followed by an elementwise multiply could be refactored as two elementwise multiplies followed by a concatenation. In some examples, an RNN for processing in accordance with the principles described herein may be defined such that the causal and non-causal operations are separately performed (e.g. in different matrix multiplications), but prior approaches do not accelerate execution of the non-causal operations.

In examples in which a cell comprises one or more matrix multiplications, each matrix multiplication y=Wx of tensors x and W (where x and W are matrices) may be equivalently expressed as a sum of two matrix multiplications y=Wx=W'x'+W"x" where W' and W" are subsets of the elements of W and x' and x" are subsets of the elements of x. It therefore follows that the RNN cell shown in FIG. 2 may be equivalently expressed as the RNN cell 600 shown in FIG. 6 in which the causal and non-causal parts of the cell calculations are performed as separate matrix multiplications 612 and 614, each of which receives a corresponding subset of the weights W shown in FIG. 2. Assuming both use the activation function tanh, the equivalence of the RNN cells 200 and 600 can be written as follows using the notation of FIGS. 2 and 6:

$$o(t) = \tanh\left(\begin{bmatrix} x(t) \\ h(t-1) \end{bmatrix}\right) \qquad (2)$$
$$= \tanh(W_x x(t) + W_h h(t-1))$$

Where the top line expresses RNN cell 200 and the bottom line expresses RNN cell 600. $W_x$ 610 are the elements of the weights W which are combined (e.g. used in processing) with the input x(t), and $W_h$ 608 are the elements of the weights W which are combined (e.g. used in processing) with the state h(t−1). The result of the non-causal calculations performed at matrix multiplication 612 are combined at the addition operation 606 with result of the causal calculations performed at matrix multiplication 614. For example, the addition operation 606 may comprise performing an element-wise addition operation of the result of the non-causal calculations with the result of the causal calculations. The sum of the causal and non-causal calculations is then subject to the activation function 206 so as to generate output o(t) 214 and output state h(t) 216.

By splitting the causal and non-causal parts of an RNN cell, the performance of the causal and non-causal operations in a hardware implementation of an RNN comprising one or more such cells may be separately optimised. In particular, since the non-causal operations do not need to wait for state values to be generated at a preceding time step, it is possible to group together the non-causal operations to be performed on a plurality of inputs and perform those operations together in parallel at a plurality of processing elements. This enables the parallel processing capabilities of an accelerator adapted to implement a neural network in hardware to be utilised. In particular, accelerators for implementing neural networks typically include parallel processing elements adapted to efficiently perform convolution operations—for example, the convolution engines 308 of accelerator 302. Without parallelisation of the non-causal calculations, the constituent operations of a cell of the neural network would be executed sequentially, typically only making full use of a single hardware instance (e.g. a single processing element 314), resulting in lower utilisation and slower inference.

Figure 6:
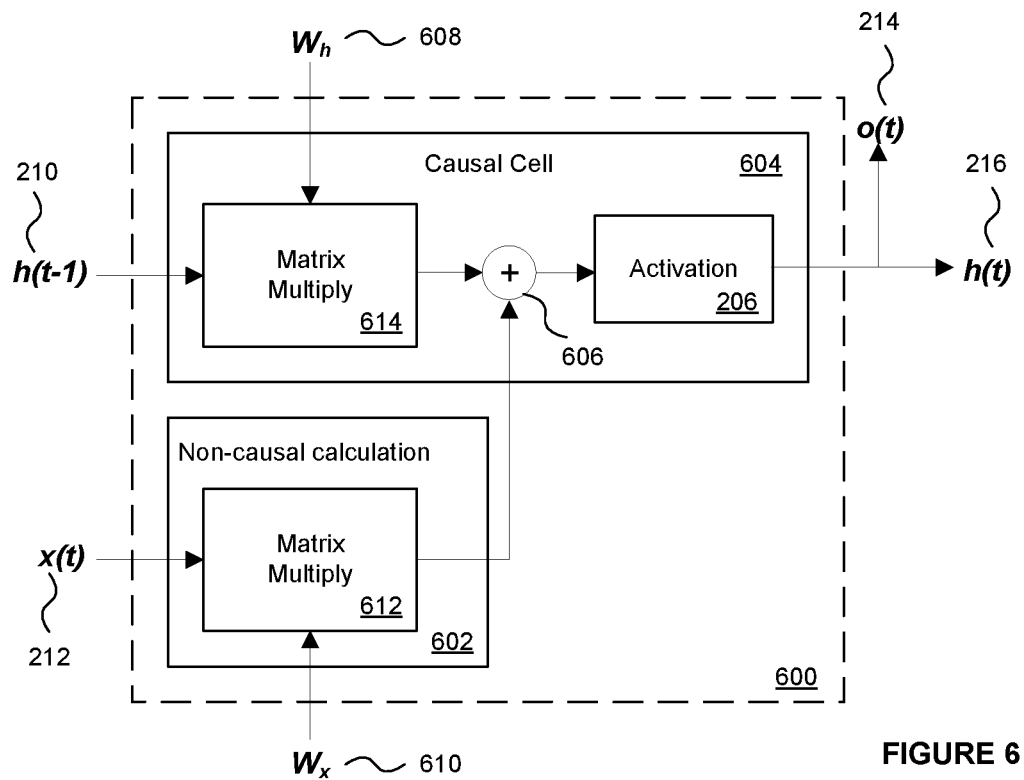
FIG. 6 is a schematic diagram of an implementation of the RNN cell of FIG. 2 in which the causal and non-causal calculations are separately performed.
Figure 7:
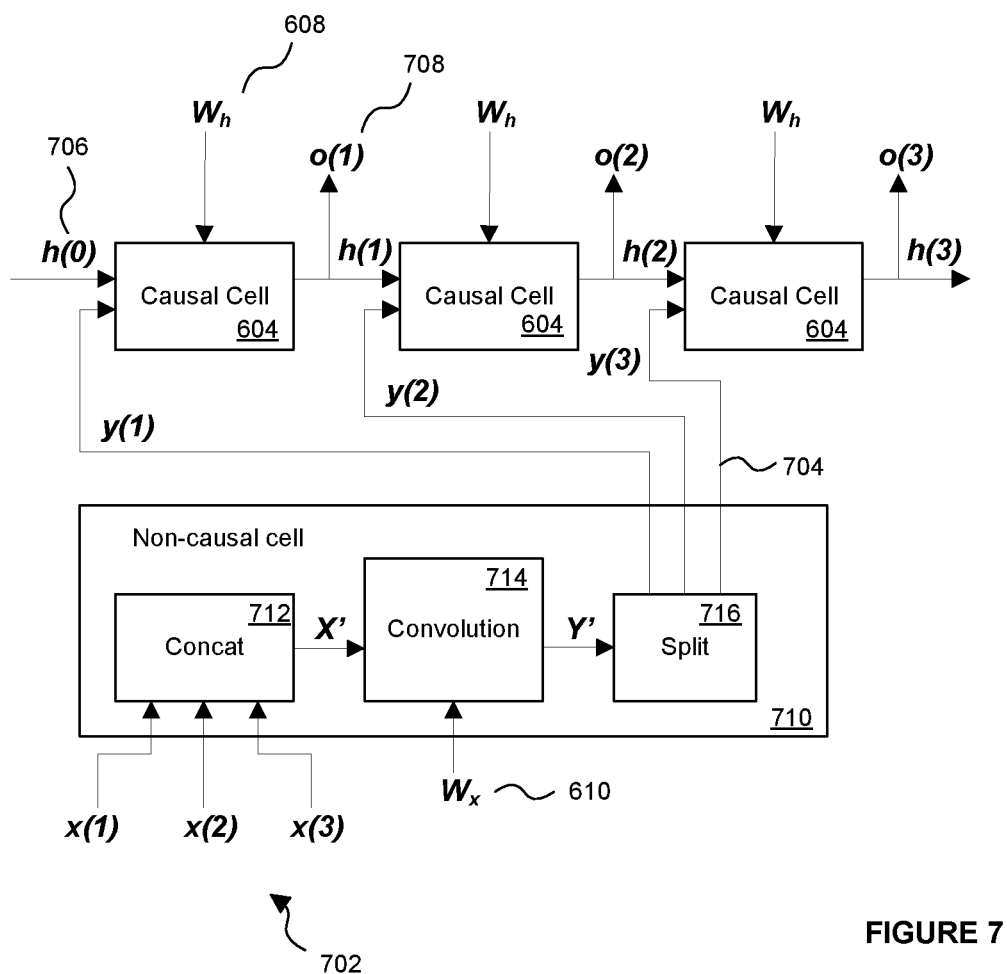
FIG. 7 is a schematic diagram of an implementation of a single RNN cell of FIG. 6 over a plurality of time steps in which the causal and non-causal calculations at each timestep are separately performed, with the non-causal calculations being performed in parallel for a plurality of timesteps.

FIG. 7 is a schematic diagram of an implementation of three of the RNN cells of FIG. 6 in which the causal and non-causal operations at each timestep are separately performed, with the non-causal operations being performed in parallel for the three timesteps. The same approach can be adopted for each cell of the unrolled RNN. In this manner, some or all of the non-causal operations of the derivative neural network described above may be performed in parallel for an instance of the derivative neural network on a partition of an input sequence.

The transformation unit 326 is configured to split out the non-causal operations from the causal operations so as to derive a static neural network for implementation at the accelerator 302. This is illustrated by the causal/non-causal split branch in the flowchart of FIG. 8. At step 802, the transformation unit 326 unrolls the RNN over a predetermined number of steps in accordance with the principles described above. At 806 the transformation unit separates at least some of the non-causal operations from the causal operations. The transformation unit groups 807 at least some of the non-causal operations of the unrolled RNN so as to enable those operations to be performed in parallel at the accelerator 302. The transformation unit may form one or more groups of non-causal operations in respect of the non-causal operations of the unrolled RNN—i.e. the inputs to a given cell of the RNN may be grouped together so as to perform a group of non-causal operations on those inputs in parallel.

The transformation unit forms a static derivative neural network 808 in accordance with the principles described above with respect to step 803 but with the non-causal operations at one or more cells of the neural network being grouped together for performance in parallel. The derivative neural network is implemented 804 at the processor 302 by the control logic 324 in the manner described above. In this manner, processing each partition of inputs at the derivative neural network running at the accelerator comprises performing the non-causal operations of one or more cells of the derivative neural network in one or more parallel operations.

In general, the causal/non-causal split at step 806 could be performed before or after unrolling step 802. For example, prior to unrolling the appropriate cells of the RNN may be substituted with factorised cells in which the non-causal and causal operations are split.

One approach to performing the non-causal operations in parallel is to convert all matrix operations into convolutions for performance at the parallel convolution engines 308 of accelerator 302. Since the convolution engines are optimised for performing convolutions, this can substantially improve the performance of running the derivative neural network in hardware, and hence the performance of the RNN represented by the derivative neural network. In data processing systems with processing elements which are optimised to perform calculations in parallel other than convolutions, the operations of the cells of the derivative neural network may be re-cast as calculations for which the processing elements are optimised.

FIG. 7 provides an illustration as to how the non-causal operations may be performed in parallel at the convolution engines 308 of the accelerator 302. In FIG. 7, all of the input tensors of the partition of input tensors 702 are concatenated at a non-causal cell 710 so as to form a tensor X. By way of example, the input tensor $x_t$ comprises 512 input values $x_t \in \mathbb{R}^{1 \times 512}$ (e.g. an audio sample of a input audio stream comprising a sequence of audio samples representing speech) and the weight tensor $W_x \in \mathbb{R}^{512 \times 1024}$. The input and weight tensors both have additional spatial dimensions (e.g. height and width) added so as to become $x'_t \in \mathbb{R}^{1 \times 1 \times 1 \times 512}$ and a weight tensor $W'_x \in \mathbb{R}^{1 \times 1 \times 512 \times 1024}$. In this example the dimensions of W' represent respectively the kernel height, kernel width, number of input channels and number of output channels, and the dimensions of X' represent respectively the batch size, data height, data width and number of input channels. All the available inputs of the partition may then be concatenated at concatenation unit 712 over the width dimension to obtain a tensor $X' \in \mathbb{R}^{1 \times 1 \times T \times 512}$, where T represents the total number of available time steps in the partition. In the present example, T=3 because the derivative neural network operates on a partition of three time steps (i.e. is derivative from an RNN unrolled over three time steps).

The dimension over which concatenation is performed may be selected in dependence on the particular characteristics of the hardware accelerator. For example, the convolution engines of some hardware accelerators may be configured such that it is advantageous to concatenate over a particular dimension (e.g. "width" or "height") so as to optimise the performance of the convolution operation performed on the result of the concatenation.

Adding additional spatial dimensions to the input tensors changes their shape but not the underlying values since the new dimensions have size '1'. It can be advantageous to change the tensor shapes because convolution operations in neural networks typically expect data as a 4D tensor. To give a simple example, a 2D tensor [[0,9,4]] having dimensions (1, 3) may be re-shaped into 4D with dimensions (1, 1, 1, 3) and the tensor would be expressed as [[[[0, 9, 4]]]].

The tensor X' can then be convolved with $W'_x$ at convolution unit 714 to obtain an intermediate output for the non-causal calculations $Y'=W'_x*X'$, where * represents the convolution operations between weights $W'_x$ and the inputs of the partition X' with a stride of one for both the height and width dimensions. The output of the convolution may be written as $Y' \in \mathbb{R}^{1 \times 1 \times T \times 1024}$. The convolution operation is the mathematical equivalent of doing a matrix multiplication of $x_t$ with $W_x$ separately for each time step, but performing these calculations as a convolution enables the utilisation of multiple convolution engines 308 at the accelerator 302 in parallel. This reduces both memory bandwidth because the weights may be copied into the coefficient buffer at the start of the convolution and not prior to calculations at each individual time step, and latency because the performance of the derivative neural network at the accelerator improves substantially. For a more typical RNN configured to perform speech recognition in a time series of audio samples in which each partition includes 16 time steps, and the RNN includes a stack of five RNN cells plus two pre-processing convolution layers and a fully connected layer, this approach reduces latency by a factor of four.

A hardware accelerator can typically process parallel streams of input data using a common set of weights (a filter) in a convolution operation. This is particularly useful when dealing with convolution layers which, for example, process an image where the same filter is applied to the whole image as sliding window. By spatially grouping input data, the input data may be handled in a similar way to a feature map on the input to a convolution operation, hence enabling processing of the input data in parallel at the hardware accelerator. In other examples, the non-causal operations may be performed in parallel as operations other than convolution operations.

Doing non-causal calculations in parallel at a plurality of processing elements improves performance in three ways. Firstly, it increases hardware utilisation since the calculations may be run over as many parallel streams as there are processing elements. Secondly, memory bandwidth consumption is reduced as the same weight coefficients (e.g. at coefficient buffer 330) may be used by the plurality of processing elements performing the parallel calculations, instead of the same weight coefficients needing to be read in from memory in respect of each input of the partition in order to perform the non-causal calculations on that input. Minimising bandwidth has the further advantage of reducing the number of cycles spent on reading/writing from memory, which improves the overall latency of the model. And thirdly, the approach reduces the processing required in the causal sequence of calculations because the non-causal calculations have been separated out, instead of being performed with the causal calculations.

At split unit 716, the intermediate output Y' is split into outputs y for each of the three time steps, where $y \in \mathbb{R}^{1 \times 1024}$. Each y is provided as the input 704 to the respective causal cells 604. The causal cells operate on the two-dimensional tensor components, rather than the 4D tensors provided to the convolution operation.

Since the causal calculation performed at each time step requires the state generated at the previous time step, the causal calculations cannot be performed in parallel. A causal cell 604 is provided for each time step of the partition, so in FIG. 7 there are three causal cells. Each of the causal cells receive as an input the corresponding tensor output y from the non-causal cell 710 and the state 706 generated by the causal cell in respect of the preceding time step. Each of the causal cells 604 may have the same functional structure as the causal cell 604 shown in FIG. 6, with each causal cell operating the same set of weights 608 on the received state 706—e.g. by means of matrix multiplication 614. The result of the operation of the weights 608 on the received state 706 is combined with the respective output from the non-causal cell, e.g. by means of addition 606. The combination of the causal and non-causal calculations is then subject to an activation function 206 so as to provide an output 708—which in the present example is also the state for the next causal cell. As is described above, in other embodiments one or more state values (e.g. tensors or single values) may be generated in respect of a time step that may or may not include the output in respect of that time step.

Returning to the data processing system shown in FIG. 3, in order to split out the non-causal calculations for a derivative neural network so as to enable those calculations to be performed in parallel, the transformation unit may be configured to process each cell of the derivative neural network so as to separate those calculations which are not dependent on state from previous cell calculations and cause the non-causal calculations to be performed in parallel at the processing elements of the accelerator. For example, in FIG. 3 the transformation unit may be configured to form a derivative neural network from the RNN representation 338 and then further process the derivative neural network so as to separate the causal and non-causal calculations in the manner described herein, the non-causal calculations being performed in parallel at the processing elements 314 of the accelerator 302.

The control logic 324 and/or the non-causal 710 and/or causal 604 cells themselves may be configured to convert inputs and weights into and out of the forms suitable for parallel processing—for example, with respect to FIG. 7, the non-causal cell 710 (e.g. its convolution unit 714) may add the additional spatial dimensions to the inputs and the weights so as to put those tensors into a form suitable for convolution. In some examples, the additional spatial dimensions need not be added to the inputs and weights and can be inferred during calculations.

When deriving a neural network from an RNN representation by unrolling the RNN over a predetermined number of time steps and separating the causal and non-causal calculations in the manner described herein, it is further advantageous to select the predetermined number of steps to be an integer multiple of the number of processing elements at the accelerator. This helps to maximise use of the processing elements during execution of the derivative neural network since the parallel non-causal calculations can be evenly spread across the processing elements of the system, maximising performance.

Figure 9:
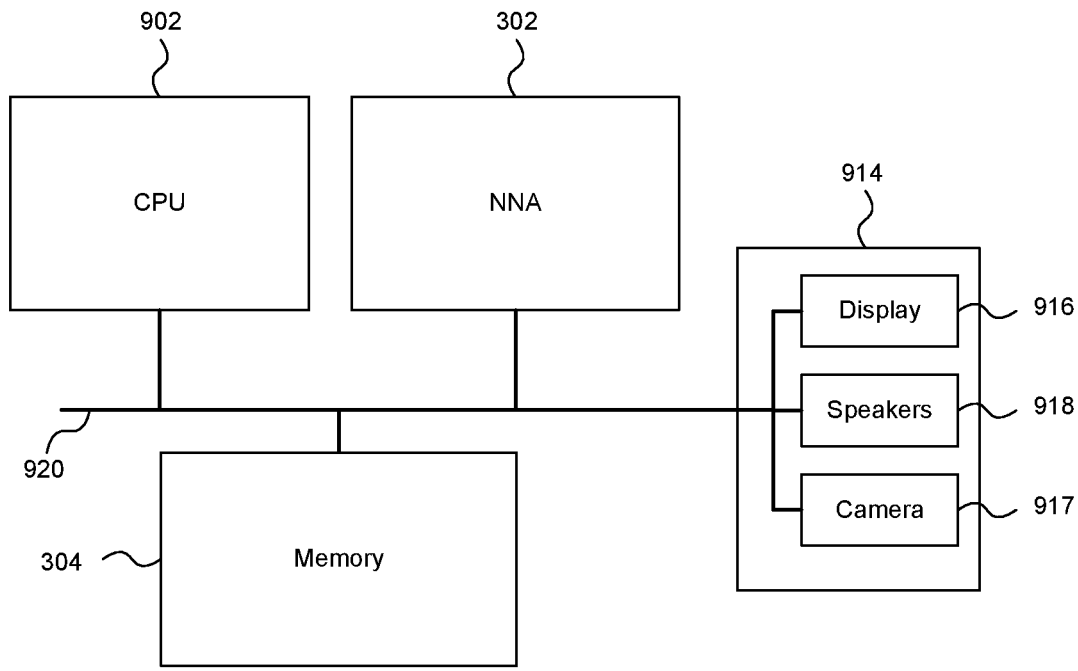
FIG. 9 shows a computer system comprising a neural network accelerator configured to implement an RNN in accordance with the principles described herein.

FIG. 9 shows a computer system in which a data processing system as described herein may be implemented. The data processing system comprises a CPU 902, an accelerator 302 (which is labelled in the figure as a neural network accelerator, NNA), a system memory 304 and other devices 914, such as a display 916, speakers 918 and a camera 922. The components of the computer system can communicate with each other via a data bus 920. At least some of the control logic 324 and/or iteration logic 342 and/or transformation unit 326 may be supported at the CPU 902.

Number Format Selection

The example of an RNN shown in FIG. 1 defines operations to be performed on an element x(t) of an input sequence and state variables h(t−1) at each timestep t, to generate state variables h(t) and an output o(t). The function defined by these operations is fixed over time: for the same values of the input and state variables, the output will be the same regardless of time index. This is a desirable property that may be referred to as time invariance. For reasons of efficiency, block-configurable number formats may be defined for values in the network as described below. These number formats should be the same across time to preserve time invariance, and this needs to be taken into account when selecting number formats so that the chosen formats are suitable for all timesteps.

RNNs differ from feed-forward (static) neural networks in that the same graph is repeated over a sequence of inputs (e.g. over a time series). Furthermore, RNN cells receive a state tensor generated at a preceding step of the RNN which will not be known at design time. In order to ensure that the behaviour of the network is consistent across time, every step in the unrolled RNN of the derivative neural network should behave in the same way given the same inputs, irrespective of the length of the unrolled RNN (i.e. the number of steps over which the RNN is unrolled), or the position of the step in the sequence of unrolled steps of the RNN. Whether the behaviour of the network is time invariant is in part determined by the number formats of the data values involved in the operations performed by the RNN.

The values of an RNN may include the elements of any tensors of the network—for example, input values (e.g. as elements of input tensors representing a time series or the output of a lower cell in a stack of cells of an RNN); weight values (e.g. as elements of weight tensors representing parameters of the network); state values (e.g. as elements of state tensors generated at a preceding time step of the RNN); and intermediate tensors representing values between operations of the network. The values of an RNN may be referred to herein as the network values. In a hardware implementation of an RNN, suitable number formats need to be chosen for all of the values of the network. The number format or at least some parameters of the number format of some values may be predefined. The number format of some or all values of the network may be determined in accordance with the number format selection methods described herein.

Each iteration of an RNN includes an instance of every value of the network (e.g. the elements of the tensors of the RNN). Thus, iterating an RNN N times generates N instances of its network values. In order to ensure time invariance, all instances of a value in the network should have the same number format. A method of selecting number formats will now be described for use when implementing an RNN in hardware, in particular when implementing an RNN in hardware in accordance with the principles described above (e.g. at the data processing system shown in FIG. 3).

As is known to those of skill in the art, for hardware to process a set of values, those values must be represented in a number format. Two types of number formats are fixed point number formats and floating point number formats. As is known to those skilled in the art, a fixed point number format has a fixed number of digits after the radix point (e.g. decimal point or binary point). In contrast, a floating point number format does not have a fixed radix point (i.e. it can "float"). In other words, the radix point can be placed anywhere within the representation. While representing input data values and weights in a floating point number format may allow more accurate or precise output data to be produced, processing numbers in a floating point number format in hardware is complex which tends to increase the silicon area and complexity of the hardware compared to hardware that processes values in fixed point number formats. Accordingly, hardware implementations may be configured to process input data values and weights in a fixed point number format to reduce the number of bits required to represent the values of the network and hence reduce silicon area, power consumption and memory bandwidth of the hardware implementation.

A number format type defines the parameters that form a number format of that type and how the parameters are interpreted. For example, one example number format type may specify that a number or value is represented by a b-bit mantissa m and an exponent exp and the number is equal to $m*2^{exp}$. As described in more detail below, some number format types can have configurable parameters, which may also be referred to as quantisation parameters, that can vary between number formats of that type. For example, in the example number format described above the bit width b and the exponent exp may be configurable. Accordingly, a first number format of that type may use a bit width b of 4 and an exponent exp of 6, and a second, different, number format of that type may use a bit width b of 8 and an exponent exp of −3.

The accuracy of a quantised RNN (i.e. a version of the RNN in which at least a portion of the network values are represented by a non-floating point number format) may be determined by comparing the output of such an RNN in response to input data to a baseline or target output. The baseline or target output may be the output of an unquantized version of the RNN (i.e. a version of the RNN in which all of the network values are represented by a floating point number format, which may be referred to herein as a floating point version of the RNN or a floating point RNN) in response to the same input data or the ground truth output for the input data. The further the output of the quantised RNN is from the baseline or target output, the less accurate the quantised RNN. The size of a quantised RNN may be determined by the number of bits used to represent the network values of the RNN. Accordingly, the lower the bit depths of the number formats used to represent the network values of a RNN, the smaller the RNN.

While all the network values (e.g. input data values, weight, biases and output data values) of an RNN may be represented using a single number format this does not generally produce a RNN that is small in size and accurate. This is because different operations of an RNN tend to operate on and generate values having different ranges. For example, one operation may have input data values between 0 and 6 whereas another operation may have input data values between 0 and 500. Accordingly using a single number format may not allow either set of input data values to be represented efficiently or accurately. Accordingly, the network values of an RNN may be divided into sets of two or more network values and a number format may be selected for each set. Preferably each set of network values comprises related or similar network values.

Each set of network values may be all or a portion of a particular type of network value for an operation. For example, each set of network values may be all or a portion of the input data values of an operation; all or a portion of the weights of an operation; all or a portion of the biases of an operation; or all or a portion of the output data values of an operation. Whether or not a set of network values comprises all, or only a portion, of the network values of a particular type for a cell may depend on, for example, the hardware that is to implement the RNN and the application of the RNN—e.g. identifying number formats on a per filter basis in a convolution weight tensor can increase output accuracy in some cases. For example, some hardware that can be used to implement an RNN may only support a single number format per network value type per operation, whereas other hardware that can be used to implement an RNN may support multiple number formats per network value type per operation.

Hardware for implementing an RNN, such as accelerator 302, may support one type of number format for the network values. For example, hardware for implementing an RNN may support number formats wherein numbers are represented by a b-bit mantissa and an exponent exp.

To allow different sets of network values to be represented using different number formats, hardware for implementing an RNN may use a type of number format that has one or more configurable parameters, wherein the parameters are shared between all values in a set of two or more values. These types of number formats may be referred to herein as block-configurable types of number formats or set-configurable types of number formats.

Accordingly, non-configurable formats such as INT32 and floating point number formats are not block-configurable types of number formats. Example block-configurable types of number formats are described below. The methods described herein may be performed so as to identify appropriate block-configurable types of number formats for two or more values of an RNN.

One example block-configurable type of number format which may be used to represent the network values of an RNN is the Q-type format, which specifies a predetermined number of integer bits a and fractional bits b. Accordingly, a number can be represented as Qa.b which requires a total of a+b+1 bits (including the sign bit). Example Q formats are illustrated in Table 1 below. The quantisation parameters for the Q-type format are the number of integer bits a and the number of fractional bits b.

TABLE 1

| Q Format | Description | Example |
|---|---|---|
| Q4.4 | 4 integer bits and 4 fractional bits | $0110.1110_2$ |
| Q0.8 | 0 integer bits and 8 fractional bits | $.01101110_2$ |

However, the Q format has a shortcoming in that some of the bits used to represent the number may be considered to be redundant. In an example, a number range [−0.125, 0.125) is to be represented to a precision of 3 bits. The required Q format for this example range and precision is Q0.5. However, if we assume that the range of values is known in advance, the first two bits of the number will never be used in determining the value represented in Q format. For example, the first two bits of the representation do not contribute to the final number since they represent 0.5 and 0.25 respectively and therefore fall outside of the required range. However, they are used to indicate the value of the third bit position (i.e. 0.125 and beyond due to the relative bit positions). Accordingly, the Q format described above is an inefficient fixed point number format for use within a hardware implementation of a neural network since some bits may not convey useful information.

Another example block-configurable type of number format which may be used to represent network parameters of an RNN is one in which number formats of this type are defined by a fixed integer exponent exp and a b-bit mantissa m such that a value u is equal to $u=2^{exp}m$.

In some cases, the mantissa m may be represented in two's complement format. However, in other cases other signed or unsigned integer formats may be used. In these cases the exponent exp and the number of mantissa bits b only need to be stored once for a set of two or more values represented in that number format. Different number formats of this type may have different mantissa bit lengths b and/or different exponents exp thus the quantisation parameters for this type of number format comprise the mantissa bit length b (which may also be referred to herein as a bit width, bit depth or bit length), and the exponent exp.

Another example block-configurable type of number format which may be used to represent the network parameters of an RNN is the 8-bit asymmetric fixed point (Q8A) type format. In one example, number formats of this type comprise a minimum representable number $r_{min}$, a maximum representable number $r_{max}$, a zero point z, and an 8-bit number $d_{Q8A}$ for each value in a set which identifies a linear interpolation factor between the minimum and maximum representable numbers. In other cases, a variant of this type of format may be used in which the number of bits used to store the interpolation factor $d_{QbA}$ is variable (e.g. the number of bits b used to store the interpolation factor may be one of a plurality of possible integers). In this example the Q8A type format or a variant of the Q8A type format may approximate a floating point value $d_{float}$ as shown in equation (1) where b is the number of bits used by the quantised representation (i.e. 8 for the Q8A format) and z is the quantised zero point which will always map exactly back to 0. The quantisation parameters for this example type of number format comprise the maximum representable number or value $r_{max}$, the minimum representable number or value $r_{min}$, the quantised zero point z, and optionally, the mantissa bit length b (i.e. when the bit length is not fixed at 8).

$$d_{float} = \frac{(r_{max} - r_{min})(d_{QbA} - z)}{2^b - 1} \quad (3)$$

In another example the Q8A type format comprises a zero point z which will always map exactly to 0.f, a scale factor scale and an 8-bit number $d_{Q8a}$ for each value in the set. In this example a number format of this type approximates a floating point value $d_{float}$ as shown in equation (2). Similar to the first example Q8A type format, in other cases the number of bits for the integer or mantissa component may be variable. The quantisation parameters for this example type of number format comprise the zero point z, the scale scale, and optionally, the mantissa bit length b.

$$d_{float} = (d_{Q8A} - z) * \text{scale} \quad (4)$$

Determining a number format of a specific block-configurable type of number format may be described as identifying the one or more quantisation parameters for the type of number format. For example, determining a number format of a number format type defined by a b-bit mantissa and an exponent exp may comprise identifying the bit width b of the mantissa and/or the exponent exp. The particular type of block-configurable number format may be predefined for a given network value.

To reduce the size, and increase the efficiency, of a hardware implementation of an RNN the hardware implementation may be configured to process data values in block-configurable number formats. Generally the fewer bits that are used to represent the network values of an RNN (e.g. its input data values, weights, and output data values), the more efficiently the RNN can be implemented in hardware. However, typically the fewer bits that are used to represent the network values of an RNN the less accurate the RNN becomes. Accordingly, it is desirable to identify number formats for representing the network values of the RNN that balance the number of bits used to represent the network values and the accuracy of the RNN. Furthermore, since the range of input, weight and state data values may vary, a hardware implementation may be able to process an RNN more efficiently when the block-configurable number formats used to represent the data values can vary for each set of values (e.g. each tensor of the network). For example, the hardware implementation may be able to implement the RNN more efficiently and/or more accurately by using a block-configurable number format defined by an exponent of 2 and a mantissa bit length of 6 to represent one set of values in the network, and a block-configurable number format defined by an exponent of 4 and a mantissa bit length of 4 to represent another set of values in the network.

Methods for determining a block-configurable type of number format for a set of two or more values of an RNN will now be described. A set of two or more values of an RNN may comprise part or all of one or more tensors. For example, the methods herein may be applied to determine a number format for some or all of the values of a tensor with different number formats being identified for different sets of two or more values (e.g. different tensors or parts of tensors). Different number format selection algorithms could be used to identify number formats for different sets of two or more values.

The methods described herein may be used with any suitable number format selection algorithm, including, for example, backpropagation format selection, greedy line search and end-to-end format selection, orthogonal search format selection, maximal range (or "MinMax") format selection, outlier rejection format selection, error-based heuristic format selection (e.g. based on a sum of squared errors with or without outlier weighting), weighted outlier format selection, or gradient weighting format selection algorithms. In particular, the methods described herein may be used with the particular format selection algorithms disclosed in UK Patent Applications with publication numbers 2568083, 2568084, 2568081, or UK Patent Application number 2009432.2, each of which is herein incorporated by reference in its entirety.

In order to select number formats for the network values of an RNN, the RNN is performed on sample input data so as to provide statistics to the number format selection algorithm for every instance of the two or more values. Such statistics may be one or more of network values, mean/variance of network values, minimum/maximum network values, histograms summarising network values, gradients calculated with respect to the network output or a measure of error based on the network output, and any other data used or generated by the neural network or logic monitoring the neural network (e.g. format selection unit 344) which is required by the format selection algorithm. In some examples, the RNN is performed using a floating point number format for the values of the network. For example, the RNN may be performed in software using a floating point number format for the input data, weights, state and output data values in the network. 32-bit or 64-bit floating point number formats perform well because the number format should generally be as close to lossless as possible for best results, but it can be possible to use a block-configurable number format with a large range/large number of bits.

The RNN may be executed in any suitable manner in order to perform number format selection. For example, the RNN may be performed in software (e.g. using a deep learning framework such as TensorFlow with software support for executing dynamic graphs, or as a static graph representing a single timestep which is run for every timestep in a sequence, with number formats being selected for the network values based on statistics gathered on each run), or in hardware (e.g. at an accelerator such as accelerator 302).

In some examples, the RNN may be unrolled in the manner described above with respect to FIGS. 4 and 5 so to form a test neural network which is used to select appropriate number formats for its variables and parameters. When an RNN is unrolled, the same tensor will appear at each time step as an instance of that tensor. In order to achieve time invariance and for a derivative neural network based on an unrolled RNN to be equivalent to the original RNN, all instances of the same two or more values need to have the same format over the unrolled RNN. For example, in the unrolled graph shown in FIG. 4 in the case that the block-configurable number formats correspond to tensors, all of the input tensors x(t) to the first RNN cells 102 have the same number format and all of the state tensors $h_1(t)$ have the same number format. Different state tensors (e.g. $h_1$ and $h_2$) may have different number formats and the inputs to different RNN cells (e.g. RNN cells 102 and 103) may have different number formats.

Figure 11:
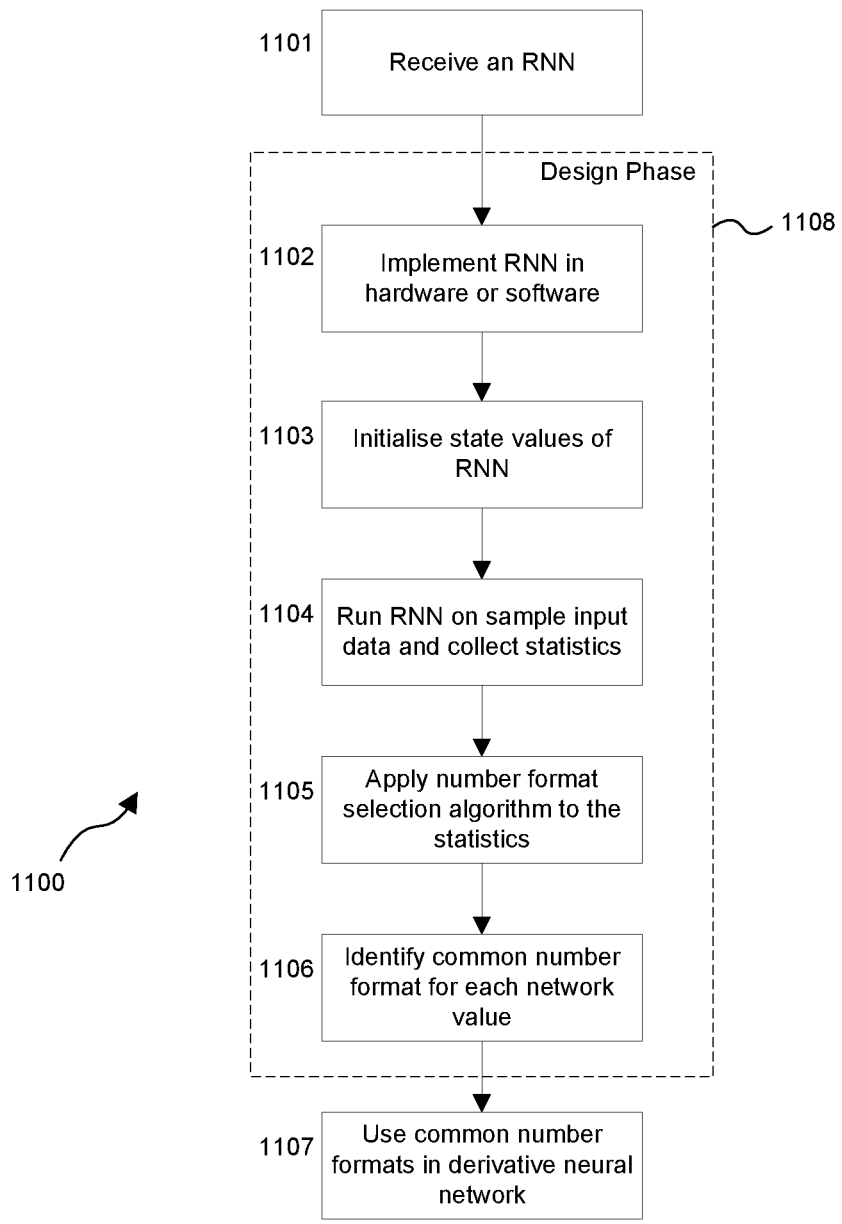
FIG. 11 shows a method of performing number format selection for an RNN.

A method of performing number format selection for two or more values of an RNN is shown in FIG. 11. The two or more values may comprise some or all of the elements of one or more tensors of the RNN. The method may be performed on receiving an RNN 1101 for implementation in hardware—for example, at the accelerator 302 of the data processing system in FIG. 3. The method may be performed in a design phase 1108 prior to implementation of the RNN in hardware according to the principles described herein or otherwise. The format selection of the design phase 1108 identified in FIG. 11 could be performed under the control of format selection unit 344 shown in FIG. 3. In some examples, the format selection unit 344 could be one and the same as the transformation unit 326.

At a first step 1102, the RNN is implemented in hardware or software as a test neural network so as to enable statistics to be gathered for the number format selection algorithm. The RNN may be implemented as a test neural network in any suitable manner. The RNN is performed over a plurality of time steps on sample input data so as to capture the statistics required by the number format selection algorithm. Often good performance can be achieved by performing only a small number of time steps. For example, for some applications performing four time steps has been found to offer good number format selection. The RNN may be run in any way that is functionally correct and outputs the data needed by the format selection method.

In some examples, the RNN may be implemented as a test neural network in software—for example at software comprised at the format selection unit 344 running at a CPU (e.g. CPU 902 of the computer system shown in FIG. 9). For example, the network could be run in TensorFlow or PyTorch and the maximum absolute values of all sets of two or more values can be output for use by a MinMax format selection algorithm. The number format selection in design phase 1108 need not be performed at the same computing system at which the RNN is to be ultimately implemented in hardware. In some examples, the RNN is implemented as a test neural network in hardware to select appropriate number formats—for example, at accelerator 302 in data processing system 300. The hardware (and its associated logic, such as control logic 324) should be capable of executing the network at a high enough precision to avoid significant quantisation errors (e.g. in 32-bit floating point) and providing suitable statistics. In some examples, the RNN may be implemented at the hardware accelerator 302 for the purpose of selecting number formats for the values of the network in accordance with the principles described herein. The RNN may be unrolled over a test number of steps so as to derive a test neural network in the manner described above with respect to step 803 in FIG. 8. In some examples, this could be performed at the transformation unit 326. The test neural network represents all or a portion of the complete unrolled RNN which is mathematically equivalent to the received representation of the RNN. The state inputs to the first time step of such a test neural network may be provided as state inputs to the test neural network itself and the state outputs from the last time step of the test neural network may be provided as state outputs from the test neural network itself. This enables the test neural network to be iterated in the manner shown in FIG. 5, with the state outputs from a first instance of the test neural network being provided as the state inputs to the next instance of the test neural network. However, if the test neural network spans a sufficient number of time steps for number formats to be identified according to the selection algorithm being used, iteration of the test neural network need not be performed and acceptable number formats may be identified from the application of a single instance of the test neural network. In examples in which the RNN is to be implemented according to the principles described herein as a derivative neural network, the number of steps of the test network may or may not be equal to the predetermined number of steps over which the RNN is unrolled in order to derive the derivative neural network. It is advantageous if the number of test steps over which the RNN is unrolled to form the test neural network is at least the number of test steps which are to be performed in order to perform number format selection for the RNN represented by the test neural network. This avoids the need for iteration of the test neural network in the manner shown in FIG. 5 and, typically, acceptable number formats can be identified through the application of a single instance of the test neural network.

The input state tensors of the implemented test neural network are initialised at 1103. This is necessary because there is no previous instance of the test neural network from which the first instance of the test neural network can receive state tensors. The initial state tensors of a neural network are generally different from the typical state tensors at subsequent time steps. Because the first time step of the test neural network is exceptional, suitable number formats cannot usually be selected based on the first time step alone. The initial state tensors are preferably the same initial state tensors used when implementing the RNN in hardware, e.g. as the derivative neural network described above. However, it is also important that the number formats work for both the first time step and for subsequent time steps. It is therefore advantageous to perform number format selection over a plurality of test time steps which include the first time step. The initialisation of state tensors results in a transient effect in the first few time steps before the network settles into its steady-state behaviour. The initialisation step 1103 will typically be performed with the implementation step 1102 as part of the implementation of the test neural network.

In order to perform number format selection, the test neural network implementing the RNN is performed 1104 on suitable sample input data so as to enable appropriate statistics to be captured for use in the number format selection algorithm. The RNN is executed for a predetermined number of one or more time steps so as to generate the statistics at each time step which are required by the number format selection algorithm. Suitable sample input data could comprise exemplary data selected to represent a typical or expected range of inputs to the RNN to be implemented in hardware. In some examples, the sample input data may be input data from the actual source to which the RNN will be applied—e.g. an audio signal on which speech recognition is to be performed. It is well known in the art to capture statistics from neural networks and it will be appreciated that the particular nature of the statistics will depend on the nature of the neural network, its application and the requirements of the number format selection algorithm being used. The statistics (e.g. data values, maximums/minimums, histogram data) generated at the RNN and/or logic associated with the RNN (e.g. at format selection unit 344) may be captured in any suitable manner. For example, in the case that the RNN is implemented in software running at CPU 902 in FIG. 9, the statistics may be stored at memory 304 for concurrent or subsequent processing by the format selection unit 344 (which may also be running at the CPU). In some examples, at least some of the statistics comprise intermediate data values generated at the RNN (e.g. between stacked RNN cells and/or operations of an RNN cell).

At step 1105, a number format selection algorithm is applied to the statistics collected from the operation of the RNN. The number format selection algorithm may run concurrently with the RNN and/or may be subsequently performed on the captured statistics. The format selection of the design phase 1108 may be performed at the format selection unit 344. The number format selection algorithm may be any algorithm for identifying block-configurable number format for the sets of two or more network values. The particular choice of algorithm is typically determined by one or more of: the application to which the RNN is applied; the nature of the tensors to which the two or more values it operates on belong; and the amount of time and/or compute resources required to run the algorithm (more complex algorithms might give better results, but might take several times longer to run).

In the present examples in which the number format is selected from block-configurable types of number format, the number of bits of the exponent may be fixed (e.g. 6 bits signed). The exponent length need not therefore be stored with each data value and may instead be defined for groups of data values—for example, an exponent length may be predefined for each tensor of the RNN, for sets of two or more elements of each tensor, for each type of tensor (e.g. different exponent lengths for inputs and/or weights and/or outputs), for groups of tensors, or for all of the tensors of the RNN. The amount of data required to store the exponent and the length of the mantissa (e.g. the number of bits required to store the number format) may be fixed and negligible compared to the number of bits required to store the actual mantissas of the network values. The number of mantissa bits is therefore the primary determinant of the number of bits required to represent the number formats of the network values.

Number format selection algorithms may determine the length (e.g. in bits) of the mantissa of a block-configurable type of number format. For example, where each block-configurable number format used by an RNN to represent data values comprises an exponent and a mantissa bit length, the mantissa bit length of the block-configurable number format used by the cell attributed the lowest portion of the quantisation error may be reduced, or the mantissa bit length of the block-configurable number format used by cell attributed the highest portion of the quantisation error may be increased. The quantisation error of a data value is the difference between the data value in an original floating point number format (i.e. as used in the implementation of the RNN for number format selection purposes) and the data value in the block-configurable number format (i.e. as proposed for use in the hardware implementation of the RNN).

Several methods have been developed for identifying number formats for representing network values of an RNN. One simple method (which may be referred to herein as the full range method or the minimum/maximum or MinMax method) for selecting a number format for representing a set of network parameters of an RNN may comprise selecting, for a given mantissa bit depth n (or a given exponent exp), the smallest exponent exp (or smallest mantissa bit depth n) that covers the range for the expected set of network values x for a operation. For example, for a given mantissa bit depth b, the exponent exp can be chosen in accordance with equation (3) such that the number format covers the entire range of x where $\lceil . \rceil$ is the ceiling function:

$$\exp = \lceil \log_2(\max(|x|)) \rceil - n + 1 \qquad (5)$$

However, such a method is sensitive to outliers. Specifically, where the set of network values x has outliers, precision is sacrificed to cover the outliers. This may result in large quantisation errors (e.g. the error between the set of network values in a first number format (e.g. floating point number format) and the set of network values in the selected number format). As a consequence, the error in the output data of the operation and/or of the RNN caused by the quantisation, may be greater than if the number format covered a smaller range, but with more precision.

In other examples, a sum of squared errors algorithm with outlier weighting may be used. This algorithm can be appropriate where relatively important values are typically those at the higher end of the range of values of a given set of two or more values. This is particularly true for weight tensors that are regularised by penalising their magnitude and so we might expect elements with higher values to have greater relative importance than lower. Also, clamping is a particularly destructive form of noise that can introduce a strong bias in the resulting quantised set of two or more values. Therefore in some applications it can be advantageous to bias the error towards retaining large values, whilst avoiding the extreme of preserving the full range at the expense of quantisation error (e.g. as in the "MinMax" method). For example, a weighting function $\alpha(x)$ as shown in equation (4) below combined with a squared measure of error could be used in a sum of squared errors algorithm.

$$\alpha(x) = \begin{cases} 1 + \dfrac{\gamma x}{SAT - \delta_e}, & \text{for } x > SAT - \delta_e \\ 1 + \dfrac{\gamma |x|}{SAT}, & \text{for } x < -SAT \\ 1, & \text{otherwise} \end{cases} \qquad (6)$$

Where SAT is a saturation point defined as $2^{exp+n-1}$, exp is the exponent of the fixed number format, n is the number of bits of the mantissa, $\delta_e$ is $2^{exp}$ (i.e. one quantisation level), and γ is the gradient which is chosen empirically. A gradient of 20 can work well for some neural networks.

A weighted outlier method is described in the Applicant's GB Patent Application No. 1718293.2, which is herein incorporated by reference in its entirety. In the weighted outlier method the number format for a set of network values is selected from a plurality of potential number formats based on the weighted sum of the quantisation errors when a particular number format is used, wherein a constant weight is applied to the quantisation errors for network values that fall within the representable range of the number format and a linearly increasing weight is applied to the quantisation errors for the values that falls outside the representable range.

Yet another method (which may be referred to as the back-propagation method) is described in the Applicant's GB Patent Application No. 1821150.8, which is herein incorporated by reference in its entirety. In the back-propagation method the quantisation parameters that produce the best cost (e.g. a combination of RNN accuracy and RNN size (e.g. number of bits)) are selected by iteratively determining the gradient of the cost with respect to each quantisation parameter using back-propagation, and adjusting the quantisation parameters until the cost converges. This method can produce good results (e.g. an RNN that is small in size (in terms of number of bits), but is accurate), however it can take a long time to converge.

In general, the selection of number formats may be conceived of as an optimisation problem which could be performed on one, some or all of the parameters of the number formats in the RNN. In some examples, a plurality of parameters of the number formats may be optimised simultaneously; in other examples, one or more parameters of the format selection method may be optimised in turn. In some examples, the bit depths of the network values may be predefined with the format selection algorithm being applied so as to select suitable exponents for the network values of the RNN. The bit depths for the may be fixed or in some examples may be a parameter to be optimised. In some examples, applying 1105 the number format selection algorithm may comprise identifying appropriate bit depths of the RNN. In order to ensure that each time step of the test neural network is identical, instances of two or more values at different time steps of the RNN are constrained to have the same bit depth. For example, each instance of the state tensor $h_1(t)$ has the same bit depth and each instance of the input tensor $x(t)$ has the same bit depth.

As has been described, the RNN is operated at step 1104 on sample input data over a predefined number of time steps without any (or minimal) quantisation of its network values in order to capture the statistics at each time step which are required by the format selection method. The format selection method is applied 1105 to the statistics captured at each time step of the RNN to select optimal number formats for the network values of the RNN. The number format selection algorithm may be chosen and/or configured so as to identify a block-configurable type of number format for each network value for which a number format is to be determined. As is explained above, typically the block-configurable number format identified by the algorithm will be expressed as a set of one or more parameters defining the type of block-configurable number format to which the block-configurable number format belongs.

The number format selection may be performed for a set of two or more network values on the statistics captured at one or more time steps. The number format selection may be performed for a set of two or more network values on statistics captured over more than one sequence of time steps, for example by applying the RNN to a first sequence of sample inputs and then to a second sequence of sample inputs. A number format selection algorithm may be applied to all of the statistics captured over multiple sequences of time steps so as to identify a single common number format for a set of two or more network values in the manner described herein, or a number format selection algorithm may be independently applied to the statistics captured over different sequences of time steps, with the number formats identified in respect of each sequence being combined in accordance with methods described herein so as to identify a single common number format for a set of two or more network values. This can help to ensure generality of the common number format identified for each set of two or more network values.

In some examples, the format selection algorithm is independently applied to the statistics (1105) captured at each time step (or a subset of the time steps for which statistics are captured) so as to identify a number format for each instance of a network value at each (or those) time step(s); the number formats for those instances then being combined to produce a common number format for the network value over all of the time steps (1106). In other examples, the format selection algorithm is (e.g. simultaneously) applied to the statistics captured over all of the predefined number of time steps for which the RNN is performed (1105) so as to identify a common number format for a network value over all of the time steps (i.e. every instance of the network value) over which the RNN is performed (1106). In such examples, the format selection algorithm identifies 1106 a common number format for use over all of the instances of the respective network value in the RNN when implemented in hardware.

Where the format selection algorithm is simultaneously applied to the statistics captured over all of the predefined number of time steps for which the RNN is performed, the output of the format selection algorithm may be a single common number format for the network value. For example, the statistics captured on running the RNN on sample input data may comprise capturing at each time step the maximum absolute values of a set of two or more values of the RNN. The format selection algorithm may then comprise combining the maximum absolute values by taking the maximum of the captured maximum absolute value at each time step and performing a MinMax algorithm on that maximum so as to identify the parameters of a common block-configurable number format for that set of values.

As explained above, in order to ensure time invariance over the time steps performed in a hardware implementation of the RNN, each instance of a network value (i.e. the network value at each time step) should have the same number format. Where the format selection algorithm is performed a plurality of times on the statistics captured for the predefined number of time steps (e.g. the format selection algorithm is independently applied to the statistics captured at each time step or a subset of the time steps), the format selection algorithm may identify more than one number format for each network value. In other words, different number formats may be identified for instances of the same set of values at different time steps. In this case, the resulting number formats are combined 1106 so as to identify 1106 a common number format for each network value of the RNN. This common number format can be used for all of the instances of the respective network value in the RNN when implemented in hardware—e.g. as a derivative neural network according to the principles described above.

For example, with reference to FIG. 4, each of the input tensors x(t), x(t+1), x(t+2) is an instance of the input tensor of the RNN at a particular time step, each of the first state tensors $h_1(t)$, $h_1(t+1)$, $h_1(t+2)$ is an instance of the first state tensor of the RNN at a particular time step, each of the second state tensors $h_2(t)$, $h_2(t+1)$, $h_2(t+2)$ is an instance of the second state tensor of the RNN at a particular time step, etc. Combining the number formats identified for a given tensor may be performed in any manner appropriate to the particular number format. The number formats may be combined at the format selection unit 344.

A block-configurable number format may be represented as a set of one or more parameters which define the number format—e.g. a first integer value may represent the exponent, and a second integer value may represent the mantissa bit depth. Each parameter may be independently combined so as to form a common number format. For example, integer parameters expressing the number formats established for the instances of a tensor may be combined by identifying a median, minimum, maximum, or mean (e.g. the integer value closest to the mean) integer value which may then be used as the respective parameter of the common number format. Using the median value of the exponents of the number formats of each set of instances has been found to offer good accuracy.

Consider the particular example where the number formats established for the instances of a network value are defined by an integer parameter defining the exponent of a block-configurable number format. In this example, a number format may be independently identified by a format selection algorithm for a network value at each of four iterations of the RNN. If the identified number formats have the exponents 5, 6, 5, 4 then the median exponent is 5 and the common number format may be identified as the number format having the exponent 5.

Once a common number format has been established, the common number format may be used 1107 in a hardware implementation of the RNN. For example, the common number formats may be provided to the transformation unit 326 of the data processing system shown in FIG. 3 for use in the derivative neural network. The same common number format identified for a network value of the RNN is used for all instances of that network value in the derivative neural network. For example, a common number format established for the input tensor x of the test neural network is used as the number format for all instances of the input tensor of the derivative neural network, and the common number format established for the first state tensors $h_1$ of the test neural network is used as the number format for all instances of the first state tensor of the derivative neural network.

A derivative neural network implemented using the number formats established according to the present method may represent the RNN unrolled over a different number of steps to the predefined number of steps over which number format selection is performed. In cases where the RNN executed so as to generate statistics for the number format selection algorithm is implemented as a derivative neural network in accordance with the principles described above, the number of steps of the RNN represented by the test neural network may be different to the number of steps represented by the derivative neural network.

As well as giving consistent behaviour across time, the method described herein also makes the selected formats more robust because information is pooled from across multiple time steps of the RNN. For example, if a certain tensor behaves differently at a given time step to the previous timesteps resulting in different number formats at those time steps, this approach has the potential to generalise this format to all other timesteps before and after it in the unrolled graph, meaning that those tensor values can be handled correctly should the unusual behaviour occur at a different point in the sequence.

The present method of performing number format selection for an RNN may be applied to neural networks in which the causal and non-causal parts are split in accordance with the principles described above. Since the causal and non-causal operations are performed separately, those operations are performed on different tensors whose common number formats may be independently selected according to the present method. This allows different number formats to be used for the causal and non-causal operations which can improve performance (e.g. inference speed) and/or enable a given level of performance to be achieved with lower memory and processing overheads.

In order to perform operations on combinations of values defined in different number formats, the number format of one or more of the values being combined may be converted to ensure that the values being combined have the same number format. For example, with reference to FIG. 7, if the outputs 704 of the non-causal cell have a first number format, and the state inputs 706 have a second number format, the addition operations at the causal cells 604 may be configured to convert the outputs 704 and/or the state inputs 706 into the same (possibly third) number format. The conversion may be performed at the hardware, for example, at the accelerator 302 in data processing system 300.

It will be well known to the skilled person how to convert data values between number formats. For example, converting from one number format with mantissa $m_1$ and exponent $e_1$ to another with mantissa $m_2$ and exponent $e_2$ with the same bit depth may be performed as follows where the number formats differ in their exponent:

$$m_2 = \frac{m_1}{2^{e_2-e_1}} \tag{7}$$

Such a conversion is subject to saturation and quantisation error, depending on whether $e_2$ is lower or higher than $e_1$.

Since the present method enables a different number format to be selected for sets of two or more values (e.g. tensors, parts of tensors, groups of tensors) of an RNN, the performance of the RNN in hardware may be optimised for all manner of implementations, especially those which use the principles described herein to form a derivative neural network based on the RNN unrolled over a predetermined number of steps. Independently performing number format selection in respect of different network values can give better results when the RNN is performed in hardware by affording more flexibility for format selection.

General Comments

The data processing system of FIG. 3 is shown as comprising a number of functional blocks. This is schematic only and is not intended to define a strict division between different logic elements of such entities. Each functional block may be provided in any suitable manner. It is to be understood that intermediate values described herein as being formed by a computer system need not be physically generated by the computer system at any point and may merely represent logical values which conveniently describe the processing performed by the computer system between its input and output.

The accelerator described herein is embodied in hardware—for example, the accelerator may comprise one or more integrated circuits. The data processing system described herein may be configured to perform any of the methods described herein. Unless otherwise specified, the functions, methods, techniques or components described above can be implemented in software, firmware, hardware (e.g. fixed logic circuitry), or any combination thereof. The terms "module," "functionality," "component", "element", "unit", "block" and "logic" may be used herein to generally represent software, firmware, hardware, or any combination thereof. In the case of software, a module, functionality, component, element, unit, block or logic represents program code that performs the specified tasks when executed on a processor. Software described herein could be performed by one or more processors executing code that causes the processor(s) to perform the algorithms/methods embodied by that software. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in one or more of a machine language, an interpreted language, a scripting language, and a compiled high-level language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor to perform the tasks specified by the code.

A processor may be any kind of device, machine or dedicated circuit, or collection or portion thereof, with processing capability such that it can execute instructions. A processor may be any kind of general purpose or dedicated processor, such as a System-on-chip, an application-specific integrated circuit (ASIC), a programmable logic array, a field-programmable gate array (FPGA), or the like. A computing system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a computer system configured to perform any of the methods described herein, or to manufacture a computer system as described herein. An integrated circuit definition dataset may be, for example, an integrated circuit description.

There may be provided a method of manufacturing, at an integrated circuit manufacturing system, a computer system as described herein. There may be provided an integrated circuit definition dataset that, when processed in an integrated circuit manufacturing system, causes the method of manufacturing a computer system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computer system will now be described with respect to FIG. 10.

Figure 10:
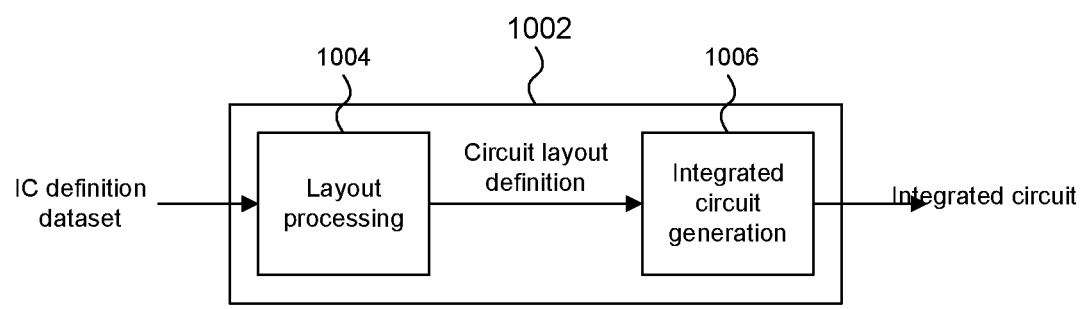
FIG. 10 is a schematic diagram of an integrated circuit manufacturing system.

FIG. 10 shows an example of an integrated circuit (IC) manufacturing system 1002 which is configured to manufacture a computer system as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a computer system as described in any of the examples herein), process the IC definition dataset, and generate an IC according to the IC definition dataset (e.g. which embodies a computer system as described in any of the examples herein). The processing of the IC definition dataset configures the IC manufacturing system 1002 to manufacture an integrated circuit embodying a computer system as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a computer system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computer-implemented method of configuring hardware adapted to perform non-recurrent neural networks to implement a recurrent neural network (RNN), the method comprising:

receiving a representation of the RNN;

implementing the representation of the RNN as a test neural network for operation on a sequence of test inputs, wherein implementing the representation of the RNN as a test neural network comprises transforming the representation of the RNN into a test neural network for operation over a first predetermined plurality of steps by unrolling the RNN over the first predetermined plurality of steps so as to form the test neural network, the test neural network being equivalent to the RNN over the first predetermined plurality of steps;

operating the test neural network on the sequence of test inputs for the first predetermined plurality of steps, each step of the test neural network comprising an instance of the two or more values of the RNN, and collecting statistics for provision to a number format selection algorithm;

applying the number format selection algorithm to the statistics so as to derive a common number format for each instance of the two or more values of the RNN of the first predetermined plurality of steps; and configuring the hardware adapted to perform non-recurrent neural networks to implement the RNN over a sequence of inputs as a derivative neural network using the common number format as the number format for each instance of the respective two or more values in the derivative neural network, wherein the derivative neural network represents the RNN unrolled over a second predetermined plurality of steps, the second predetermined plurality of steps being different to the first predetermined plurality of steps.

2. The method of claim 1, wherein each step of the test neural network is for operation on a different test input of the sequence and wherein the applying the format selection algorithm comprises applying the number format selection algorithm to the statistics captured over all of the plurality of steps, the common number format being output by the number format selection algorithm.

3. The method of claim 1, wherein the common number format is a block-configurable number format defined by one or more configurable parameters and wherein the number format selection algorithm is configured to identify a block-configurable number format of a predefined type of block-configurable number format.

4. The method of claim 1, wherein the applying the number format selection algorithm comprises:
independently identifying, for each of the plurality of steps, a number format for each instance of the two or more values; and
combining the number formats for the plurality of instances of the two or more values so as to derive the common number format for the plurality of instances of the two or more values of the RNN.

5. The method of claim 4, wherein the number format selection algorithm is configured to identify a block-configurable number format defined by one or more configurable parameters for each instance of the two or more values, and wherein the combining comprises independently combining each of the one or more configurable parameters of the block-configurable number formats identified for each instance of the two or more values so as to define the one or more configurable parameters for the common number format.

6. The method of claim 1, wherein the test neural network is configured to operate on a predefined plurality of test inputs, the predefined plurality of test inputs being equal in number to the first predetermined plurality of steps.

7. The method of claim 1, further comprising using the common number format as the number format for the respective two or more values in an implementation of the RNN on the hardware.

8. The method of claim 7, wherein the implementation of the RNN on the hardware is formed by:
transforming the representation of the RNN into a derivative neural network for operation over a second predetermined plurality of inputs of the sequence of inputs, the derivative neural network having one or more state inputs and one or more state outputs and being equivalent to the RNN over the second predetermined plurality of steps of the RNN; and
iteratively applying the derivative neural network to the sequence of inputs by:
implementing a sequence of instances of the derivative neural network in hardware; and
providing the one or more state outputs from each instance of the derivative neural network at the hardware as the one or more state inputs to a subsequent instance of the derivative neural network at the hardware so as to operate the RNN over a sequence of inputs longer than the second predetermined plurality of inputs.

9. The method of claim 8, wherein the common number format formed for each of the two or more values of the RNN is used as the number format for all of the instances of the two or more values in the derivative neural network.

10. The method of claim 8, wherein the RNN comprises one or more cells, each cell arranged to receive a cell state input generated at a preceding step, and the transforming the RNN into the test neural network further comprises, at each cell:
identifying non-causal operations which are for performance without dependence on the state input generated at a preceding step; and
in the derivative neural network, grouping together at least some of the non-causal operations at a plurality of instances of the cell over at least some of the predetermined plurality of steps for processing in parallel at the hardware.

11. The method of claim 10, wherein the cell comprises causal operations which are for performance in dependence on the cell state input and the transforming the RNN further comprises configuring the test neural network such that the result of the non-causal operations performed at the cell in respect of an input from the sequence of test inputs is combined with the causal operations performed at the cell in respect of that same test input.

12. The method of claim 10, wherein the two or more values are used in the non-causal operations and the RNN comprises two or more other values which are used in the causal operations, and the applying the number format selection algorithm to the statistics is performed so as to independently derive the common number format for the two or more values of the RNN and a second common number format for the two or more other values of the RNN.

13. The method of claim 1, wherein the first predetermined plurality of steps comprises fewer steps than the second predetermined plurality of steps.

14. The method of claim 1, wherein the sequence of test inputs comprise exemplary input values selected to represent a typical or expected range of input values to the RNN.

15. A data processing system for configuring a hardware accelerator adapted to perform non-recurrent neural networks to implement a recurrent neural network (RNN), the data processing system comprising:
a processor;
a transformation unit configured to receive a representation of the RNN and transform the representation of the RNN into a test neural network for operation over a first predetermined plurality of steps, wherein the transformation unit is configured to unroll the RNN over the first predetermined plurality of steps so as to form the test neural network, the test neural network being equivalent to the RNN over the first predetermined plurality of steps;
control logic configured to implement the representation of the RNN at the processor as the test neural network for operation on a sequence of test inputs, each step of the test neural network comprising an instance of the two or more values of the RNN; and
a format selection unit configured to cause the processor to operate the test neural network on the sequence of test inputs for the first predetermined plurality of steps and collect statistics for provision to a number format selection algorithm,
wherein the format selection unit is configured to apply the number format selection algorithm to the statistics so as to derive a common number format for each instance of the two or more values of the RNN of the first predetermined plurality of steps;

wherein the control logic is configured to configure the hardware accelerator adapted to perform non-recurrent neural networks to implement the RNN over a sequence of inputs as a derivative neural network using the common number format as the number format for each instance of the respective two or more values in the derivative neural network, wherein the derivative neural network represents the RNN unrolled over a second predetermined plurality of steps, the second predetermined plurality of steps being different to the first predetermined plurality of steps.

16. The data processing system of claim 15, further comprising the hardware accelerator, wherein the control logic is further configured to cause the representation of the RNN to be implemented at the hardware accelerator as the derivative neural network using the common number format for the two or more values of the RNN.

17. The data processing system of claim 16, further comprising iteration logic configured to, subsequent to the representation of the RNN being implemented at the hardware accelerator as the derivative neural network, iteratively apply the derivative neural network to the sequence of inputs by:
  causing a sequence of instances of the derivative neural network to be implemented at the hardware accelerator; and
  providing the one or more state outputs from each instance of the derivative neural network at the hardware accelerator as the one or more state inputs to a subsequent instance of the derivative neural network at the hardware accelerator so as to cause the hardware accelerator to operate the RNN over a sequence of inputs longer than the second predetermined plurality of inputs.

18. The data processing system of claim 15, wherein the derivative neural network has one or more state inputs and one or more state outputs and is equivalent to the RNN over the second predetermined plurality of steps of the RNN.

19. A non-transitory computer readable storage medium having stored thereon computer readable instructions that, when executed at a computer system, cause the computer system to perform a computer-implemented method of configuring hardware adapted to perform non-recurrent neural networks to implement a recurrent neural network (RNN), the method comprising:
  receiving a representation of the RNN;
  implementing the representation of the RNN as a test neural network for operation on a sequence of test inputs, wherein implementing the representation of the RNN as a test neural network comprises transforming the representation of the RNN into a test neural network for operation over a first predetermined plurality of steps by unrolling the RNN over the first predetermined plurality of steps so as to form the test neural network, the test neural network being equivalent to the RNN over the first predetermined plurality of steps;
  operating the test neural network on the sequence of test inputs for the first predetermined plurality of steps, each step of the test neural network comprising an instance of the two or more values of the RNN, and collecting statistics for provision to a number format selection algorithm;
  applying the number format selection algorithm to the statistics so as to derive a common number format for each instance of the two or more values of the RNN of the first predetermined plurality of steps; and
  configuring the hardware adapted to perform non-recurrent neural networks to implement the RNN over a sequence of inputs as a derivative neural network using the common number format as the number format for each instance of the respective two or more values in the derivative neural network, wherein the derivative neural network represents the RNN unrolled over a second predetermined plurality of steps, the second predetermined plurality of steps being different to the first predetermined plurality of steps.

* * * * *